United States Patent [19]
Yamamoto et al.

[11] Patent Number: 5,930,015
[45] Date of Patent: Jul. 27, 1999

[54] OPTICAL ACCESS SYSTEM

[75] Inventors: Takaya Yamamoto, Kawasaki; Katsuyuki Yamazaki, Tokyo; Shu Yamamoto, Shiki; Yotaro Yatsuzuka, Yokohama, all of Japan

[73] Assignee: Kokusai Denshin Denwa Kabushiki Kaisha, Tokyo, Japan

[21] Appl. No.: 08/794,048

[22] Filed: Feb. 3, 1997

[30] Foreign Application Priority Data

Feb. 5, 1996 [JP] Japan ..................... 8-040316

[51] Int. Cl.⁶ ........................................ H04J 14/02
[52] U.S. Cl. .................... 359/125; 359/137; 359/139; 359/143; 359/168
[58] Field of Search ................... 359/124, 112, 359/125, 126, 135, 137, 139, 143, 144, 168

[56] References Cited

U.S. PATENT DOCUMENTS

| | | | |
|---|---|---|---|
| 4,963,729 | 10/1990 | Spillman et al. | 359/168 |
| 5,010,586 | 4/1991 | Mortimore et al. | 359/168 |
| 5,572,612 | 11/1996 | Delavaux et al. | 359/168 |
| 5,608,565 | 3/1997 | Suzuki et al. | 359/126 |

*Primary Examiner*—Leslie Pascal
*Attorney, Agent, or Firm*—Lackenbach Siegel Marzullo Aronson & Greenspan, P.C.

[57] ABSTRACT

An optical access system is disclosed in which subscribers' terminals and optical coupler-splitters of nodes are maintenance-free and required control is effected on the part of the central office alone. At a first position, down-link optical digital signals are generated, which are made "1s" every n bits (n being an integer equal to greater than 2). The optical digital signals, except a train of optical pulses every n bits, are sent as down-link information over a transmission line. At a second position, the optical digital signals, except the optical pulse train, are demodulated from the transmitted down-link optical digital signals, and in an optical gate circuit on which the down-link optical digital signals are incident, up-link optical digital signals based on up-link message data is formed in synchronization with the optical pulses corresponding to every n-th bits and is transmitted to the first position over the transmission line. At the first position, the up-link optical digital signals sent from the second position is received from the transmission line.

7 Claims, 26 Drawing Sheets

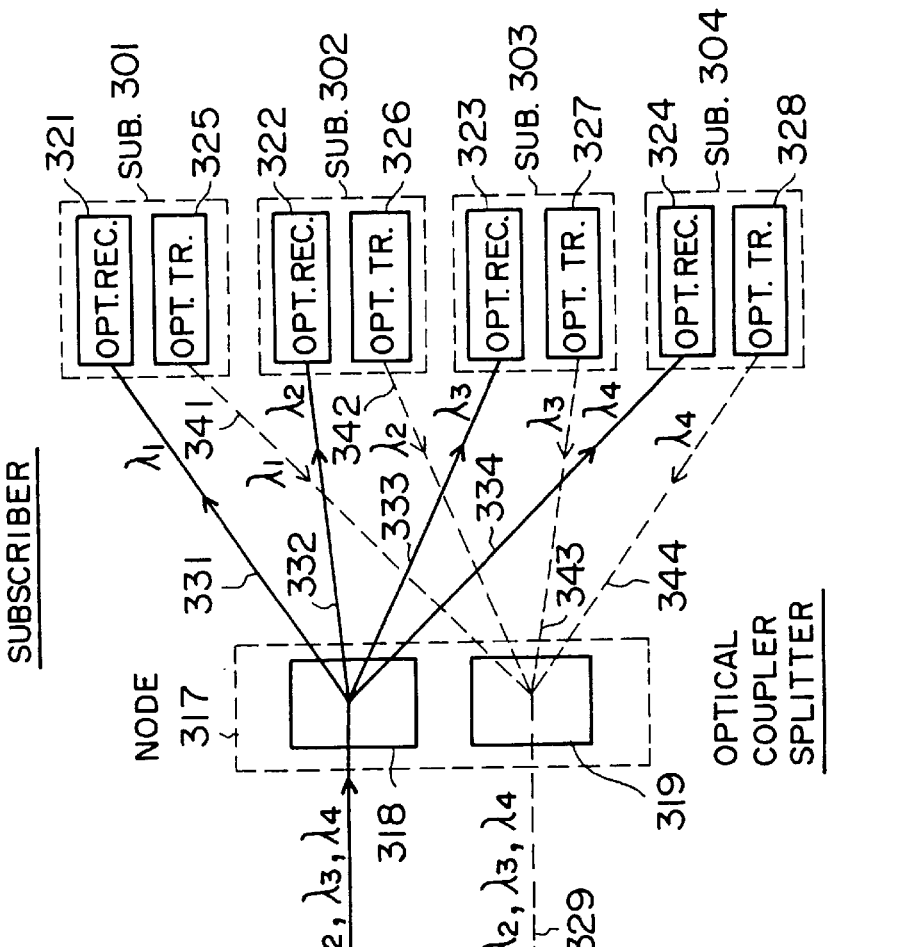
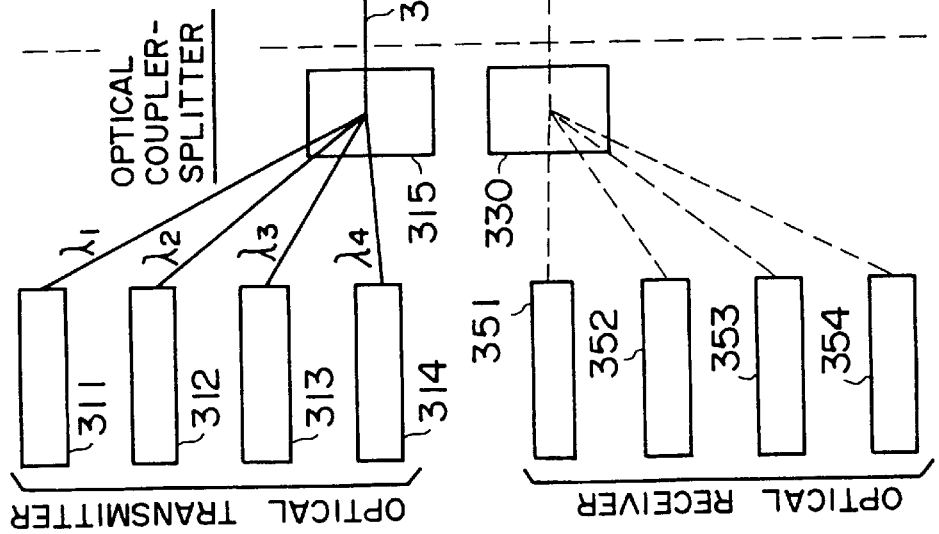
Fig. 26 PRIOR ART

OPTICAL ACCESS SYSTEM

BACKGROUND OF THE INVENTION

The present invention relates to an optical access system or optical subscriber communication or optical CATV employing a high density wavelength-multiplexing system.

In FIG. 26 there is shown an example which employs a wavelength multiplexing system in an access network from the central office to subscribers. Let it be assumed that wavelengths $\lambda_1$ to $\lambda_4$ (the number of subscribers in this example is four) are assigned to subscribers 301 to 304, respectively. Optical signals of wavelengths $\lambda_1$ to $\lambda_4$ from optical transmitters 311 to 314 of the central office are multiplexed by an optical coupler-splitter 315 and then forwarded to one optical fiber 316. The multiplexed optical signals are split, by an optical coupler-splitter 318 in a node 317 placed near the subscribers, into optical signals of wavelength $\lambda_1$ to $\lambda_4$ respectively corresponding to subscribers 301 to 304, thereafter being received by optical receivers 321 to 324 of the subscribers 301 to 304 via optical fibers 331 to 334. Such a network is commonly called a passive double star (PDS) network. As regards a message from the subscriber, for example, 301 to the central office, an optical signal of the wavelength $\lambda_1$ sent out from an optical transmitter 325 is transmitted over an optical fiber 341 to the node 317, where it is wavelength-multiplexed by an optical coupler-splitter 319 with optical signals from other subscribers 302 to 304 transmitted over optical fibers 342 to 344, and the thus wavelength-multiplexed optical signals are transmitted to the central office over one optical fiber 329. In the central office, the multiplexed optical signals are split by an optical coupler-splitter 330 into signals of the respective wavelengths, which are fed to individual optical receivers 351 to 354.

In the optical access system employing the wavelength-multiplexing scheme, the wavelengths are usually spaced 1 to 2 nm apart. The oscillation wavelength of a semiconductor laser as a light source undergoes a temperature change of 0.1 nm/°C. even if it is a distributed feedback laser. If the temperature of the optical transmitter placed in the subscriber's home varies 20° C., the oscillation wavelength will change by a value of 2 nm. When the wavelength of the optical transmitter 325 of the subscriber 301, initially set at a wavelength $\lambda_1$ as shown by (a) in FIG. 27, changes to a wavelength $\lambda_1'$ due to a change in the ambient temperature of the optical transmitter 325, a crosstalk to adjacent channels will occur even if the wavelength characteristics of the optical coupler-splitter 319 placed in the node 317 of the network and the optical coupler-splitter 330 of the central office do not vary as shown by (b) and (c) in FIG. 27. To avoid this, it is necessary to stabilize the wavelength of the optical transmitter placed in the subscriber's station. In many cases, a Peltier element is used for temperature control of the light source in a quest to stabilize its wavelength.

The optical coupler-splitter 318 (or 319) of the node 317 is mounted in a conduit line or on a mast, and it is considered that freedom from maintenance is a precondition for the design of an economical system. Even if the wavelength of the optical transmitter 325 of the subscriber 301 is stabilized at a wavelength $\lambda_1$ as depicted by (a) in FIG. 28, the wavelength characteristic of the optical coupler-splitter 319 in the node 317 may sometimes shift by a value $\Delta\lambda$ due to adverse environmental conditions as shown by (b) in FIG. 28. Even if the optical coupler-splitter is formed of quartz glass, its wavelength characteristic undergoes a temperature change of 0.01 nm/°C. owing to the temperaturedependency of the refractive index of quartz glass. A 100° C. temperature change (for example, an operating temperature of -40 to 65° C. is required outdoors) will cause a wavelength change of 1 nm. That is, $\Delta\lambda=1$ nm. This influence is serious in the high density wavelength-multiplexing system. Provided that the wavelength characteristic of the optical coupler-splitter at the central office side is such as shown by (c) in FIG. 28, the optical signal (a) of the wavelength $\lambda_1$ from the optical transmitter 325 of the subscriber 301 is intercepted owing to the deviation characteristic (b), and hence it does not reach the central office. Even if the optical signal is allowed to pass through the optical coupler-splitter 319 of the node 317 by changing the wavelength of the light source of the optical transmitter 325 to $\lambda_1+\Delta\lambda$, the optical signal is inhibited from the passage through the optical coupler-splitter 330 at the central office side, and hence it does not reach the optical receiver 351 of the central office.

In an optical network in which the wavelength characteristics of optical coupler-splitters and optical filters vary due to an ambient temperature change, no proposals have been made so far on a light source wavelength control method and on a wavelength-multiplexing optical access system utilizing the method.

In ordinary optical access systems using the passive double star (PDS) scheme, optical coupler-splitters are provided in nodes at the central office side and at midpositions in the transmission lines for the up-link optical signal from the subscribers to the central office as well as for the down-link optical signal from the central office to the subscribers. Even if such optical coupler-splitters exhibit the same wavelength characteristic when placed in the same environment, their wavelength characteristics change when they are disposed in different environments. In such a situation, the wavelength-multiplexing communication may sometimes be impossible; this problem becomes severer in higher density wavelength-multiplexing communications. The control function, which the optical transmitter of the subscriber is required to possess so as to overcome the problem, is not limited only for wavelength-stabilization of the light source but also wavelength control while monitoring variations in the wavelength characteristic of the network. This puts a heavy burden on the subscriber's terminal and hence inevitably raises its cost.

SUMMARY OF THE INVENTION

An object of the present invention is to provide an economical, stable and easy-to-maintain optical access system in which subscribers' terminals and optical coupler-splitters in a node are maintenance-free and required control is effected on the part of the central office alone.

To attain the above object, the optical access system according to the present invention has a structure in which:

at a first position, means is provided for generating an optical digital signal of a p-bit/sec transmission rate by an optical transmitter as a down-link optical signal of a wavelength $\lambda$ to a second position, for making optical pulses of the optical digital signal "1s" at every n-th (n being an integer equal to or greater than 2) bits, for forming down-link information from the first position to the second position by removing from the optical signal the "1" optical pulses at every n-th bits, and for forwarding the down-link information to the bilateral optical transmission line as an optical digital signal of the p-bit/sec transmission rate;

at the second position, means are provided for splitting a part of the down-link optical signal transmitted to the second position; an optical receiver for receiving the part split from the down-link optical signal, extracting a train of the optical pulses of every n-th bits and demodulating the p-bit/sec optical digital signal except the optical pulses of every n-th bits as the down-link information pulses; an optical gate circuit on which the remaining part of the down-link optical signal is incident; and means for turning ON and OFF the optical gate circuit in synchronization with the optical pulses of every n-th bits in accordance with the presence or absence of pulses of up-link message data from the second position to the first position to permit and inhibit the passage through the optical gate circuit of the optical pulses of every n-th bits of the down-link optical signal incident on the optical gate circuit to form an up-link optical signal, and forwarding the up-link optical signal from the optical gate circuit to the bilateral optical transmission line; and at the first position, means is further provided for separating from the transmission line the up-link optical signal transmitted from the second position; and an optical receiver for receiving the separated up-link optical signal.

Further, in case of forming a wavelength-multiplex bilateral optical transmission line between the first position and each of a plurality of second positions 1 to m, an optical access system according to the present invention has a structure wherein:

a first bilateral optical transmission line for wavelength-multiplex transmission is provided between the first position to a third position halfway between the first position and the plurality m of second positions; a plurality m of second bilateral optical transmission lines are provided between the third position and the plurality m of second positions in correspondence therewith; and the first bilateral optical transmission line and the plurality m of second bilateral optical transmission lines are mutually connected via a third optical coupler-splitter to form an optical transmission line system in which wavelength-multiplexed optical signals of wavelengths $\lambda_1$ to $\lambda_m$ transmitted over the first bilateral optical transmission line are optically coupled so that respective ones of the multiplexed signals of the wavelengths $\lambda_1$ to $\lambda_m$ are transmitted over corresponding ones of the plurality m of second bilateral optical transmission lines;

at a first position, for each of the wavelengths $\lambda_1$ to $\lambda_m$ means is provided for generating an optical digital signal of a p-bit/sec transmission rate as a down-link optical signal of the corresponmding wavelength concerned to the second position by a first optical transmitter having its wavelength stabilized by a wavelength stabilizer whose standard wavelength is variable, for making optical pulses of the optical digital signal "1s" at every n-th (n being an integer equal to or greater than 2) bits, for forming down-link information from the first position to the second position by removing from the optical signal the "1" optical pulses at every n-th bits, for optically coupling the optical digital signals of the respective wavelengths by a first optical coupler-splitter into a composite optical digital signal as the down-link information, and for forwarding the down-linkinformation to the bilateral optical transmission line as an optical digital signal of said p-bit/sec transmission rate;

at the second position, for each of the wavelengths $\lambda_1$ to $\lambda_m$: means is provided for splitting a part of the down-link optical signal transmitted to the second position, from a corresponding one of the second bilateral optical transmission lines; an optical receiver for receiving the portion split from said down-link optical signal, extracting a train of the optical pulses of every n-th bits and demodulating the p-bit/sec optical digital signal except the optical pulses of every n-th bits as the down-link information pulses; an optical gate circuit on which the remaining part of the down-link optical signal is incident; and means for turning ON and OFF the optical gate circuit in synchronization with the optical pulses of every n-th bits in accordance with the presence or absence of pulses of up-link message data from the second position to the first position to permit and inhibit the passage through the optical gate circuit of the optical pulses of every n-th bits of the down-link optical signal incident on said optical gate circuit to form an up-link optical signal, and for forwarding the up-link optical signal from the optical gate circuit to the corresponding bilateral optical transmission line; and at the first position, for each of the wavelengths $\lambda_1$ to $\lambda_m$, means is further provided for separating from the transmission line the up-link optical signal transmitted from the second position; and an optical receiver for receiving the separated up-link optical signal.

Further, according to the present invention, the third optical coupler-splitter at the third position is a reflecting filter which is formed by a cascade connection of optical coupler-splitters for coupling and splitting optical signals of the m wavelengths $\lambda_1$ to $\lambda_m$ and has a peak value of its reflectivity at a wavelength $\lambda_0$ different from the m wavelengths $\lambda_1$ to $\lambda_m$.

To control the wavelength characteristic of the optical network and the wavelength of the light source for each optical transmitter, the optical access system according to the present invention has a structure wherein: the first and second optical coupler-splitters at the first position are each an optical coupler-splitter which can be controlled to shift its wavelength characteristic and the third optical coupler-splitter at the third position is a reflecting filter which is formed by a cascade connection of optical coupler-splitters for coupling and splitting optical signals of the m wavelengths $\lambda_1$ to $\lambda_m$ and has a peak value of its reflectivity at a wavelength $\lambda_0$ different from the m wavelengths $\lambda_1$ to $\lambda_m$; a first "0" optical transmitter for the wavelength $\lambda_0$ is further provided at the first position, an optical signal from said first "0" optical transmitter is forwarded to the first bilateral optical transmission line, the optical signal of the wavelength $\lambda_0$ is reflected by the third optical-splitter at the third position back to the first position over the first bilateral optical transmission line, the reflected optical signal is separated from the first bilateral optical transmission line at the first position and is received by a first "0" optical receiver placed at the first position to detect the center wavelength $\lambda_0$ of the reflecting filter; a value proportional to a difference between the standard wavelength value obtained from the wavelength stabilizer and the wavelength $\lambda_0$ is fed back to the first and second optical coupler-splitters and an optical coupler-splitter in the wavelength stabilizer, and the standard wavelength value of the wavelength stabilizer is corrected with the difference; and the output wavelengths $\lambda_1$ to $\lambda_m$ of the plurality m of first optical transmitters and the wavelength characteristics of the first and second optical coupler-splitters are controlled.

The present invention is used to build an optical access system of the passive double star (PDS) scheme. Wavelengths $\lambda_1$ to $\lambda_m$ are assigned to m subscribers. In the central office, m optical transmitters for generating optical signals of the wavelengths $\lambda_1$ to $\lambda_m$ and an optical transmitter for generating an optical signal of a wavelength $\lambda_0$ to detect a wavelength variation of an optical coupler-splitter in a PDS node are placed, and optical signals of (m+1) wavelengths from these optical transmitters are coupled by an optical coupler-splitter disposed in the central office into a composite optical signal, which is provided on a transmission line. The composite optical signal is split by the optical coupler-splitter in the node into optical signals for the respective subscribers. In each subscriber's station, a part of the optical signal sent thereto is fed to an optical receiver to detect a down-link signal. The thus transmitted optical signal contains an optical pulse train for carrying up-link information pulses as well as the down-link optical signal. The remainder of the down-link optical signal is input into a semiconductor laser optical amplifier and is gated in synchronization with the optical pulse train by turning ON and OFF the semiconductor laser optical amplifier in accordance with the up-link information pulses to be transmitted by the optical pulse train, the resulting up-link optical signal is sent backward over the transmission line. In the optical coupler-splitter of the node the up-link optical signal is coupled with up-link optical signals from other subscribers and the optical signal of the wavelength $\lambda_0$ for detecting a wavelength shift of this optical coupler-splitter, and the composite optical signal is sent to the central office over the transmission line. In the central office, only the up-link optical signals sent back thereto are fed to the optical coupler-splitter, by which they are branched to the respective optical receivers to detect the individual optical signals. The optical receiver, which receives the optical signal of the wavelength $\lambda_0$, detects a wavelength shift of the optical coupler-splitter placed in the node. The two optical coupler-splitters provided in the central office are adapted so that their wavelength characteristics can be controlled in accordance with the shift amount of the wavelength of the optical coupler-splitter in the node. The wavelength shift amount of the optical coupler-splitter in the node is also fed back to a wavelength stabilizer placed in the central office, by which the reference wavelengths of the (m+1) optical transmitters in the central office are also corrected.

BRIEF DESCRIPTION OF DRAWINGS

Embodiments of the present invention will hereinafter be described in detail with reference to accompanying drawings, in which:

FIG. 26 is a block diagram showing an example of the optical access system using a conventional multiplexing system;

DETAILED DESCRIPTION

EMBODIMENT 1

Figure 1:
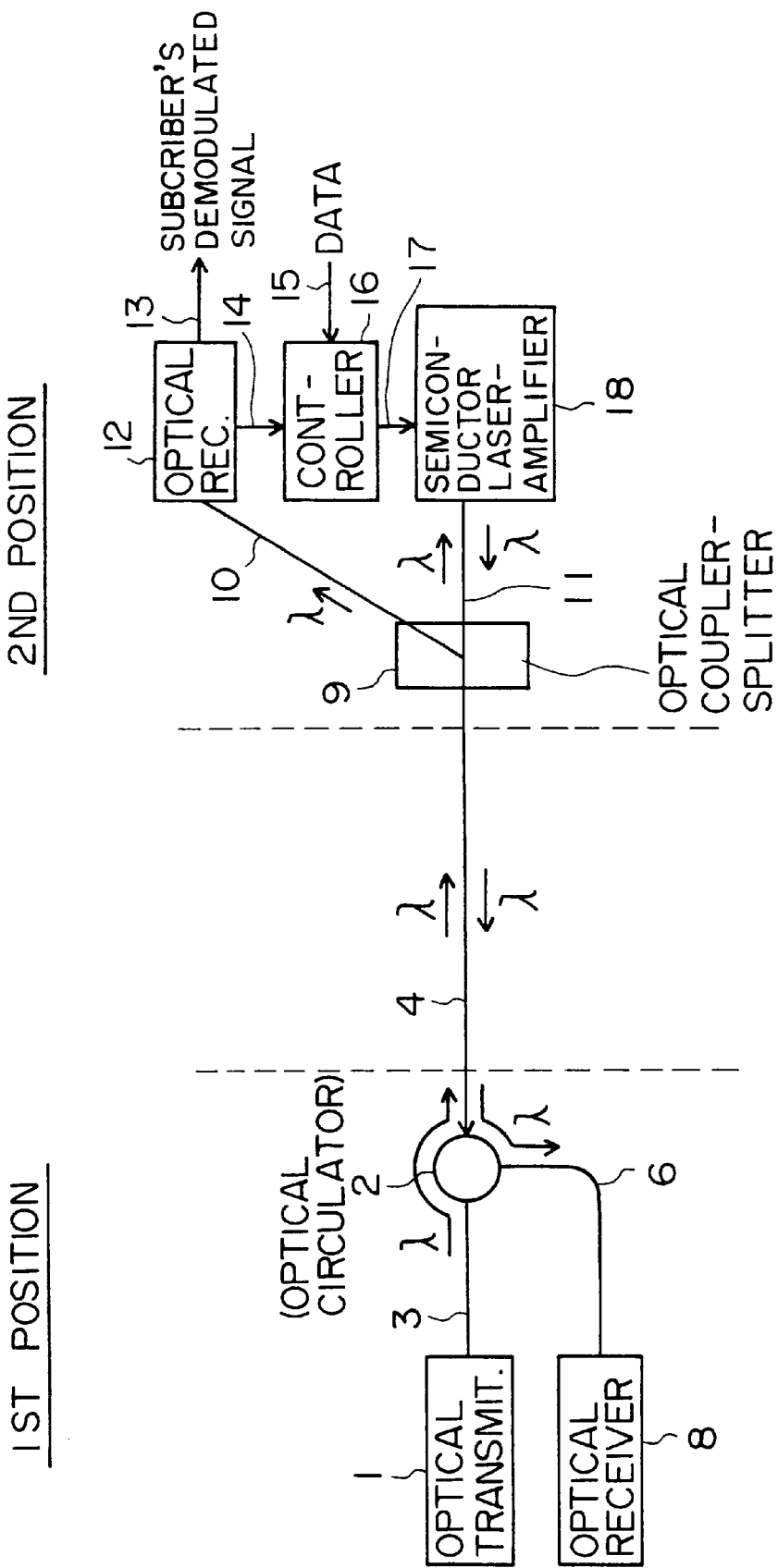
FIG. 1 is a block diagram illustrating the structure of an embodiment of the present invention.

With reference to FIG. 1 illustrating a block diagram of an embodiment of the present invention, reference numeral 1 denotes an optical transmitter for generating a down-link optical signal of the wavelength at a first position (a central office), 2 an optical circulator, 3 an optical fiber, 4 an optical fiber connecting the first position (the central office) and a second position (a subscriber's station), 6 an optical fiber, 8 an optical receiver for the up-link optical signal, 9 an optical coupler-splitter at the second position (the subscriber's station), 10 and 11 optical fibers, 12 an optical receiver for receiving a part of the down-link optical signal split by the optical coupler-splitter 9, 13 a demodulated down-link message, 14 clock pulses for the up-link signal extracted from the down-link signal, 15 up-link message data, 16 an optical amplifier controller for controlling a semiconductor laser-amplifier 18 which operates as an optical gatecircuit in synchronization with the clock pulses 14 in accordance with the up-link message data 15, and 17 the output from the control circuit.

Figure 2:
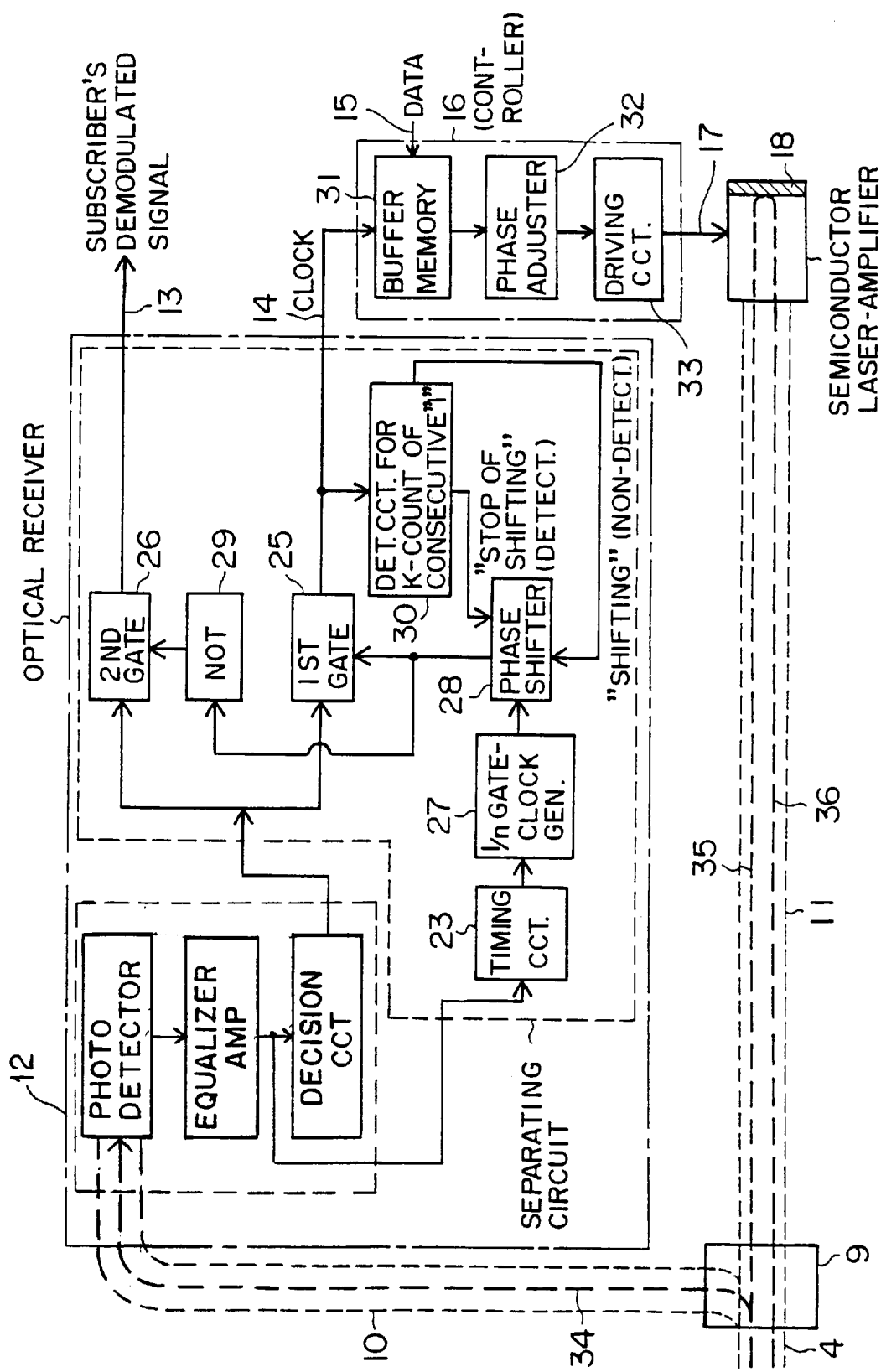
FIG. 2 is a block diagram showing examples of the structure of an optical receiver 12 and an optical controller 16 for use in the present invention.

FIG. 2 illustrates in block form the optical receiver 12 and the controller 16. In the optical receiver 12, reference numeral 21 denotes a photodetector, 22 an equalizer amplifier, 23 a timing circuit, 24 a decision circuit, 25 a first gate circuit, 26 a second gate circuit, 27 a 1/n gate-clock generator, 28 a phase shifter, 29 a NOT circuit, and 30 a detection circuit for K-count of consecutive "1". In the controller 16, reference numeral 31 denotes a buffer memory, 32 a phase adjuster, and 33 a pumping circuit for pumping the semiconductor laser-amplifier. Reference numeral 34 a part of the down-link optical signal split by the optical coupler-splitter 9, 35 the remainder of the down-link optical signal split by the optical coupler-splitter 9, and 36 an up-link optical signal generated by the semiconductor laser-amplifier 18. The elements 21, 22 and 24 constitute a demodulator for the down-link signal 34, and the elements 23, 25, 26, 27, 28, 29 and 30 constitute a separating circuit for separating the demodulator output to a subscriber's demodulated siganl and the clock pulses 14.

Figure 3:
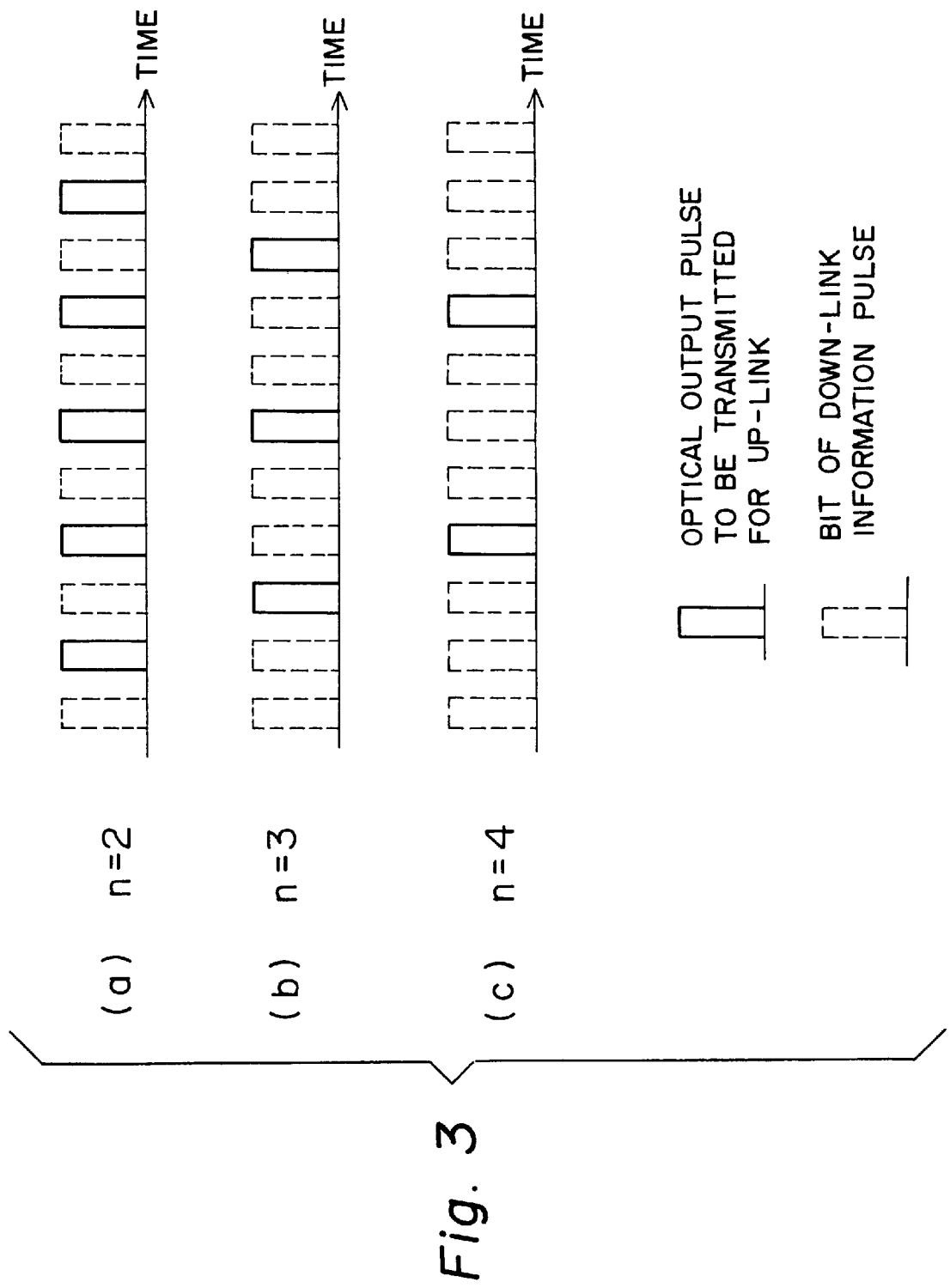
FIG. 3 is a diagram showing examples of the structure of a down-link optical signal for use in the present invention.

A description will be given, with reference to FIGS. 1 and 2, of the operation of this invention system. Assume, for example, that the data rate of the down-link message is 600 Mb/s and the data rate of the up-link message also 600 Mb/s. The transmission rate, p bits/s, of the down-link optical signal, which is generated by the optical transmitter 1 placed in the central office, is p=1200 Mb/s and an optical pulse for the up-link message always exists every other bit as shown by a train (a) in FIG. 3. In this instance, n=2. Digital signals of the down-link message (indicated by the broken lines) and optical pulses (indicated by the solid lines) for carrying the up-link message alternate with each other. The solid-lined pulses always remain at the "1" level, whereas the broken-lined pulses go to the "1" or "0" level according to the down-link message data. When the transmission rate of the up-link signal need not be as high as 600 Mb/s, it can be reduced down to 400 Mb/s by setting n=3 as shown by a train (b) in FIG. 3 and to 300 Mb/s by setting n=4 ((c) in FIG. 3). When the semiconductor laser-amplifier 18 placed in the subscriber's station at the second position is driven, the optical pulses for the up-link are amplified up to the "1" level and when it is not driven, they are attenuated down to the "0" level. By turning ON and OFF the amplifier according to the up-link message data, the up-link optical signal is generated by the optical amplifier. This will be described in detail later on.

The down-link optical signal from the optical transmitter 1 is transmitted over the optical fiber 4 to the subscriber's station at the second position via the optical circulator 2. A part of the down-link optical signal is transmitted over the optical fiber 10 via the optical coupler-splitter 9 at the second position to the optical receiver 12, wherein it is converted by the photodetector 21 to an electric signal. The electric signal is equalized and amplified by the equalizer-amplifier 22, after which a part of its output is input into the timing circuit 23 and the remainder the decision circuit 24. The input into the decision circuit 24 is decided at the timing set by the timing circuit 23, and the output from the decision circuit 24 is distributed to the first and second gate circuits 25 and 26.

Figure 4:
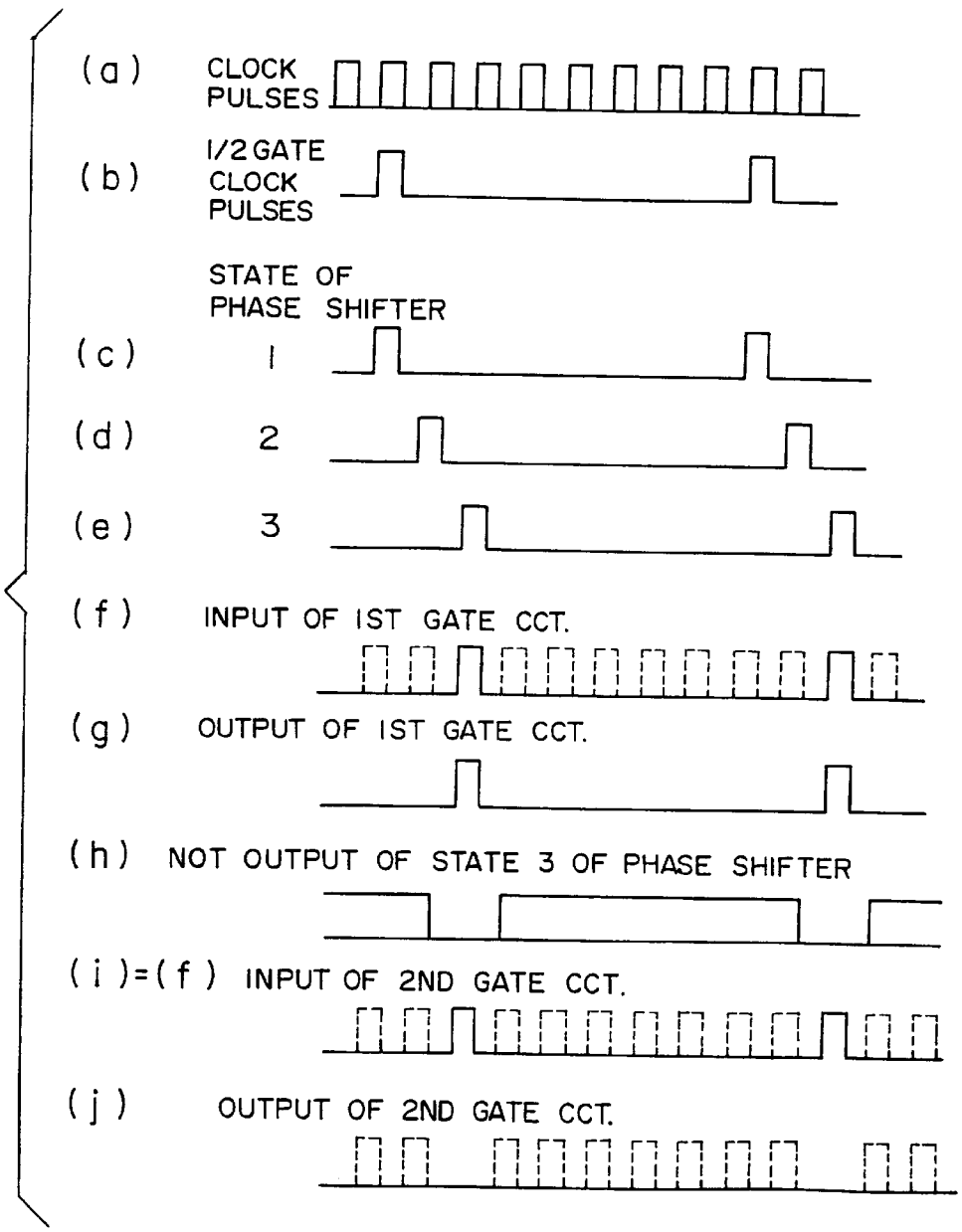
FIG. 4 is a timing chart explanatory of an operation for detecting a clock pulse for an up-link optical signal from the down-link optical signal.

The 1/n gate-clock generator 27 generates 1/n gate-clock pulses ((b) in FIG. 4) from the output of the timing circuit 23 ((a) in FIG. 4). The 1/n gate-clock pulses are shifted by the phase shifter 28 on a bitwise basis as shown by (c), (d) and (e) in FIG. 4 each time the detection circuit 30 enters its non-detecting state. Provided that the input signal to the first gate circuit 25 and the output from the phase shifter 28 are such as shown by (f) and (e), respectively, in FIG. 4, the output from the first gate circuit 25 becomes such as depicted by (g) in FIG. 4. The detection circuit 30 counts "1" outputs from the first gate circuit 25. When having counted K outputs, the detection circuit 30 decides that the phase of the 1/n gate-clock pulse at this timing is a clock pulse for the up-link signal and stops the phase shifter from its shifting operation. That is, while the detection circuit 30 is in the non-detecting state, the phase shifter 28 shifts one clock and remains intact over K clocks, thereafter shifting by one clock pulse. The same operations are repeated upon each counting of K outputs "1" of the first gate circuit 25. The 1/n gate-clock pulses 14 are input into the buffer memory 31 of the controller 16. The up-link message data 15 read by this clock into the buffer memory 31 is sent to the phase adjuster 32.

The phase adjuster 32 is a circuit for finely adjusting the phase relationship between the clock pulses for up-link information and the optical pulses for the up-link optical signal which are provided to the semiconductor laser-amplifier 18. Based on the output from the phase adjuster 32, the driving or pumping circuit 33 applies driving or pumping current pulses to the semiconductor laser-amplifier 18.

When the phase shifter 28 is in the state (e) of FIG. 4 (in the state of synchronization), the NOT circuit 29 generates such an output as shown by (h) in FIG. 4 and the output from the second gate circuit 26, which is produced by the gate operation with the NOT output and the input to the second gate circuit 26 (FIG. 4(i)=(f)), becomes such as shown by (j) in FIG. 4, which is used as the subscriber's demodulated signal 13.

From the functional point of view, the above operation is to accurately separate the down-link and up-link optical signals, i.e. synchronize their phases, by detecting K consecutive "1s" while shifting the 1/n gate-clock pulses by the phase shifter 28. The value K corresponds to the time interval to the establishment of synchronization and may preferably be small. With too small a value K, however, the probability of failure in synchronization increases due to consecutive "1s" in the down-link optical signal. In practice, the value K is set approximately in the range of 8 to 32.

In the period prior to the establishment of synchronization, signals in which the down-link and up-link signals are not accurately separated are sent to the subscriber and the central office. Since these signals become frame-out-of-synchronization in the transmission mode of the optical access system, for instance, in a synchronous transmission mode (STM) or asynchronous transmission mode (ATM), they indicates that the optical access system is in the process of establishing synchronization. To explicitly indicate that the system is in the process of establishing synchronization, it is also possible to make the down-link signal a "1" consecutive signal and hold OFF the optical pulses for the up-link signal while the phase shifter is in the non-detecting state. This process for the establishment of synchronization is automatically performed. For example, when a transmission error or short break occurs on a fiber, the detection circuit 30 enters the non-detecting state and the phase shifter 28 starts the shift operation. Upon recovery from the error, the synchronization is established. In other words, the circuit of the present invention can automatically detect and recover from errors. While the above description has been given on the assumption that the bandwidth ratio of the down-link signal to the up-link signal is 1:1/n, this ratio could easily be reversed by exchanging the phase shifter 28 and the NOT circuit 29 in FIG. 2. In ordinary subscribers, the down-link bandwidth is wider than the up-link one due to services such as the distribution of TV signals or the like. If the TV station is a subscriber, however, the down-link bandwidth is narrower than the up-link one. It depends on the type of subscriber traffic service which link is assigned the 1/n bandwidth and what value is set as n, and they are determined at the stage of a subscription contract. With the present invention, it is possible to meet subscribers' requirements for various kinds of services.

The advantages referred to above are particularly effective when using the asynchronous transmission mode (ATM). Let it be assumed, for example, that the transmission rate of the up-link signal is set at 600 Mb/s so as to achieve the maximum traffic from the subscriber. The traffic from the subscriber's station varies every moment, but the traffic speed or transmission rate can freely be determined by the use of the ATM scheme (e.g. 45 Mb/s for TV communication and 30 Mb/s for inter-LAN communication), because the ATM scheme allows ease in speed matching by transmitting empty cells when the transmission rate does not reach a trransmission rate of 600 Mb/s. When the maximum traffic exceeds a trransmission rate of 600 Mb/s, the value n will be changed. This can easily be dealt with by modifying the subscription contract and associated parameters of the access system.

Figure 5:
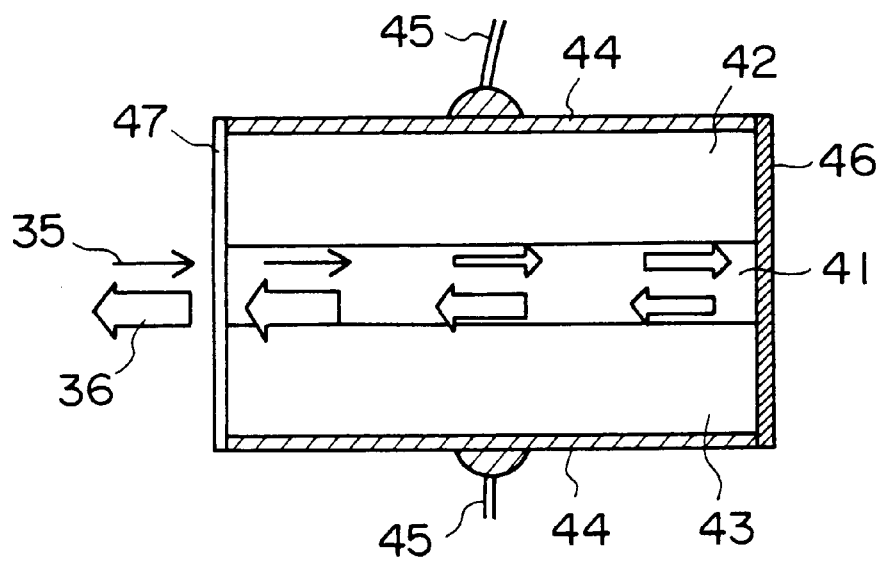
FIG. 5 is a sectional view schematically illustrating an example of the construction of a semiconductor laser amplifier for use in the present invention and explanatory of its operation.
Figure 6:
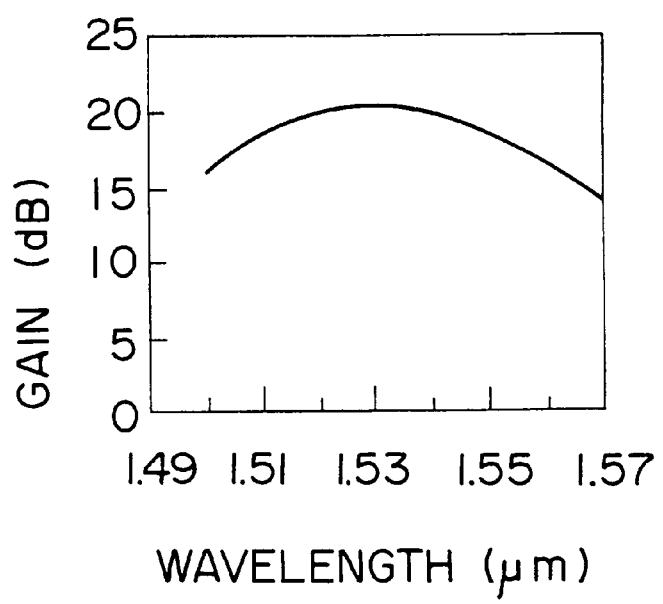
FIG. 6 is a graph showing the relationship of the wavelength to the gain of the semiconductor laser amplifier for use in the present invention.

FIG. 5 is a schematic sectional view of the semiconductor laser-amplifier 18. Reference numeral 41 denotes an active layer, 42 a p-type clad layer, 43 an n-type clad layer, 44 each of electrodes, 45 each of lead wires to the electrodes, 46 a total reflection film and 47 an anti-reflection film. In FIG. 6 there is shown the wavelength dependency of the gain of the semiconductor laser-amplifier. The half width at half maximum of the gain is approximately 60 nm. The peak gain of the semiconductor laser-amplifier undergoes a temperature change of 0.5 nm/°C. Even if a temperature change by 50° C. in the subscriber's station, the wavelength of the peak gain fluctuates only 25 nm. Since the gain variation by this temperature change can be accommodated into the system margin, there is no need of controlling the oscillation wavelength of the semiconductor laser in response to temperature variations. This is one of the reasons for which the semiconductor laser-amplifier is used in the subscriber's station.

Figure 7:
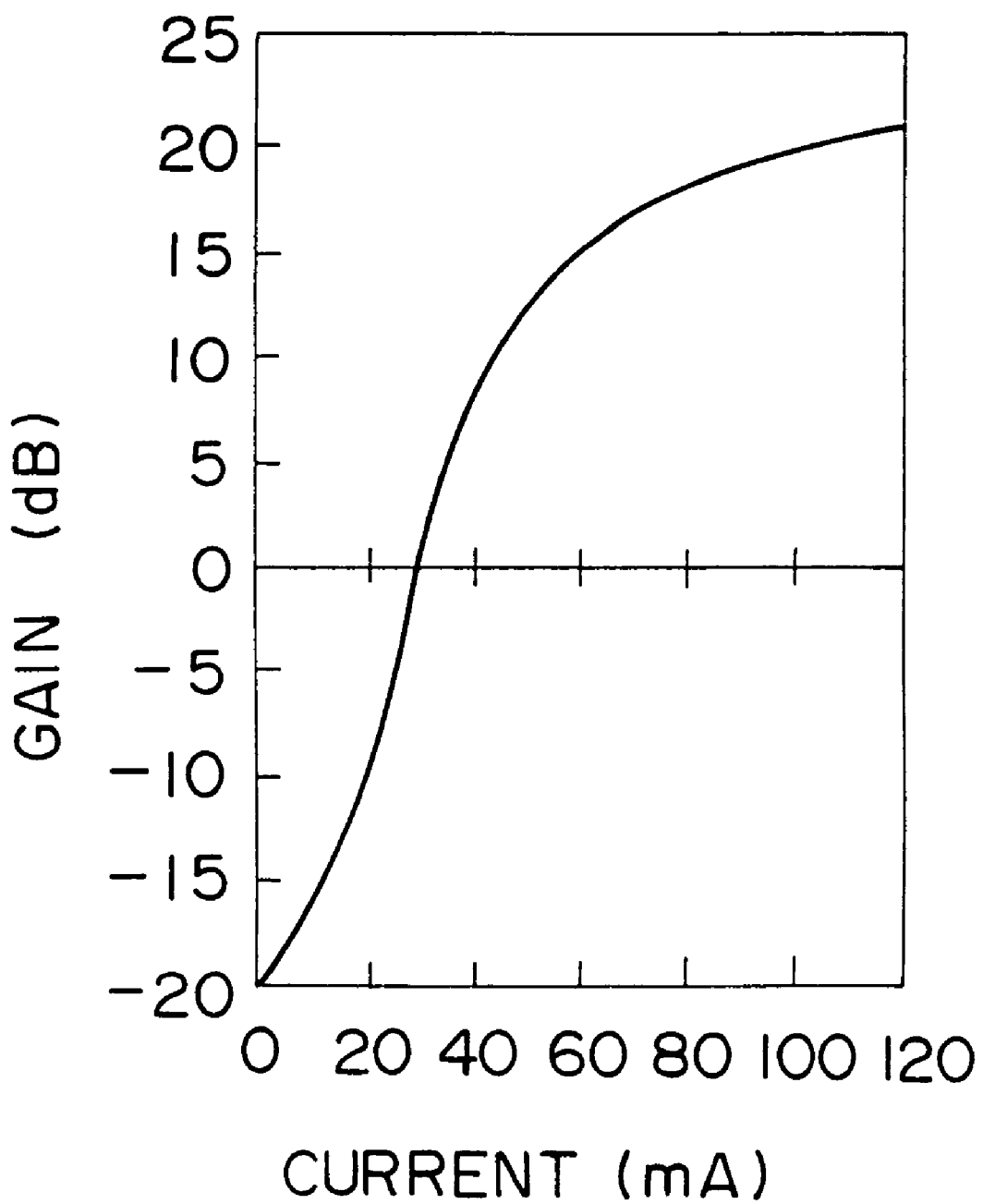
FIG. 7 is a graph showing the driving current vs. gain characteristic of the semiconductor laser amplifier for use in the present invention.
Figure 8:
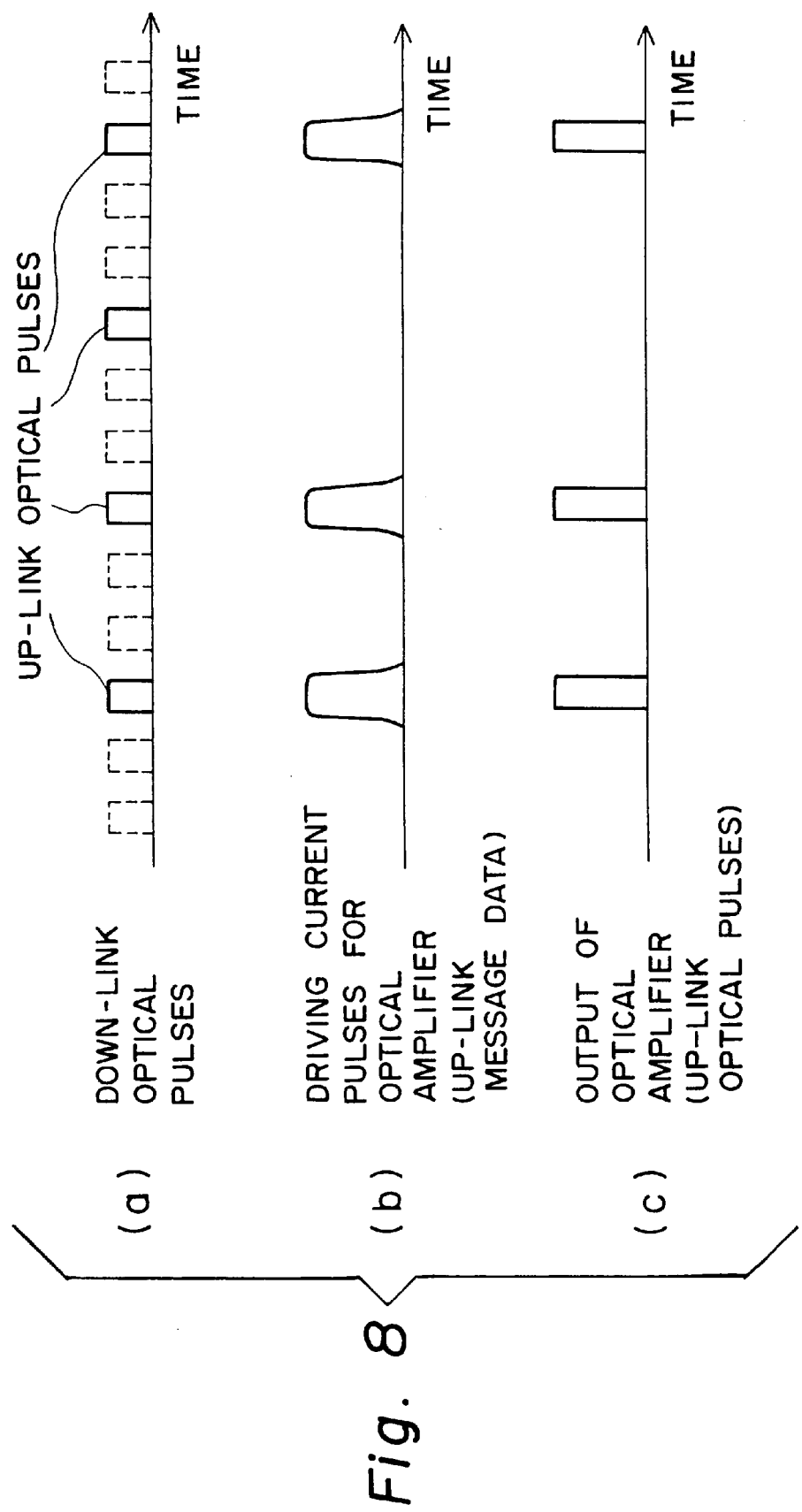
FIG. 8 is a graph showing the relationships among down-link optical pulses incident on the semiconductor laser amplifier, driving current pulses for an optical amplifier and an optical amplifier output serving as up-link optical pulses.

FIG. 7 shows an example of a change in the gain between the input optical fiber and the output optical fiber with respect to the semiconductor laser-amplifier pumping current. In this instance, the semiconductor laser-amplifier operates as an amplifier on a pumping current above 30 mA and as an attenuator on a current below 30 mA. As shown in FIG. 8, when the up-link information has a state "1," pumping current pulses above 30 mA (FIG. 8(b)) are applied to the optical amplifier 18, by which up-link optical pulses (indicated by the full lines) selected from in the down-link optical signal 35 (FIG. 8(a)) launched thereinto are amplified. The thus amplified optical pulses are reflected by the total reflection film 46 again to pass the active layer 41 and amplified, thereafter being emitted through an incident facet having the anti-reflection film. As a result, such up-link optical pulses 36 as shown by (c) in FIG. 8 are obtained from the optical amplifier 18. The semiconductor laser-amplifier has a response speed of several gigahertz. In contrast to this, an erbium-doped optical fiber laser amplifier has a response speed on the order of kilohertz. Another reason for the use of the semiconductor laser amplifier is its fast response property.

Figure 9:
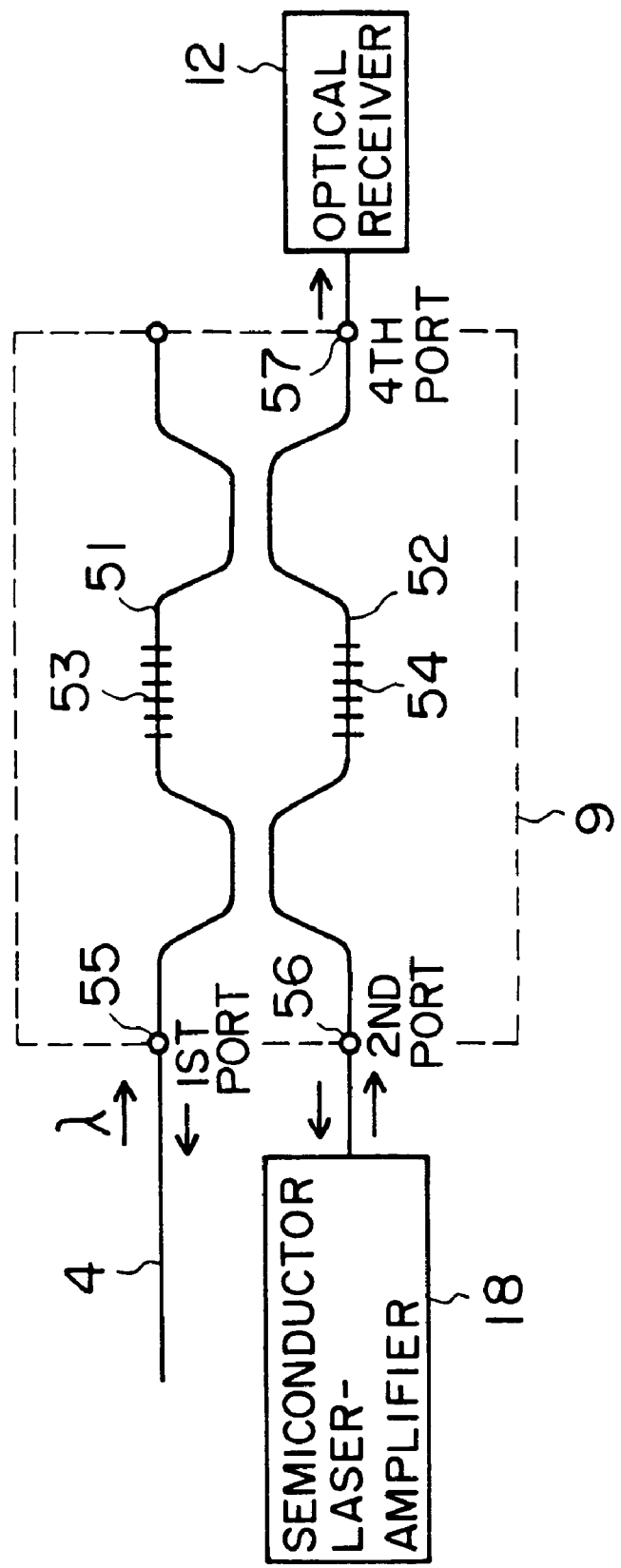
FIG. 9 is a diagram illustrating, by way of example, the constructions of optical coupler-splitters 71, 74 and 77 for use in the present invention.

The up-link optical pulses are sent over the optical fiber 4 to the first position via the optical coupler-splitter 9. The optical coupler-splitter 9 has such a construction as shown in FIG. 9, in which gratings 53 and 54 each having a certain reflectivity R with respect to the wavelength λ are formed on two arms 51 and 52 of an optical waveguide type Mach-Zehender interferometer. When supplied with the down-link optical pulses at its first port 55, the optical coupler-splitter 9 provides output pulses at the rate of 1-R of the down-link optical pulses to a fourth port 57, from which the output pulses are fed to the optical receiver 12. From a second port 56 the output power provided at the rate of R of the down-link optical pulses is emitted for incidence to a semiconductor laser amplifier 18. The power of the amplified optical pulses is reduced down to the rate of R and is incident to the optical fiber 4 via the first port 55. The optical coupler-splitter 9 serves also as an optical filter and cuts off light which is spontaneously emitted as noise from the semiconductor laser amplifier 18. The up-link optical pulses transmitted over the optical fiber 4 are separated by the circulator 2 from the down-link optical pulses at the first position (in the central office), where they are sent over the optical fiber 6 to the optical receiver for demodulation.

Figure 10:
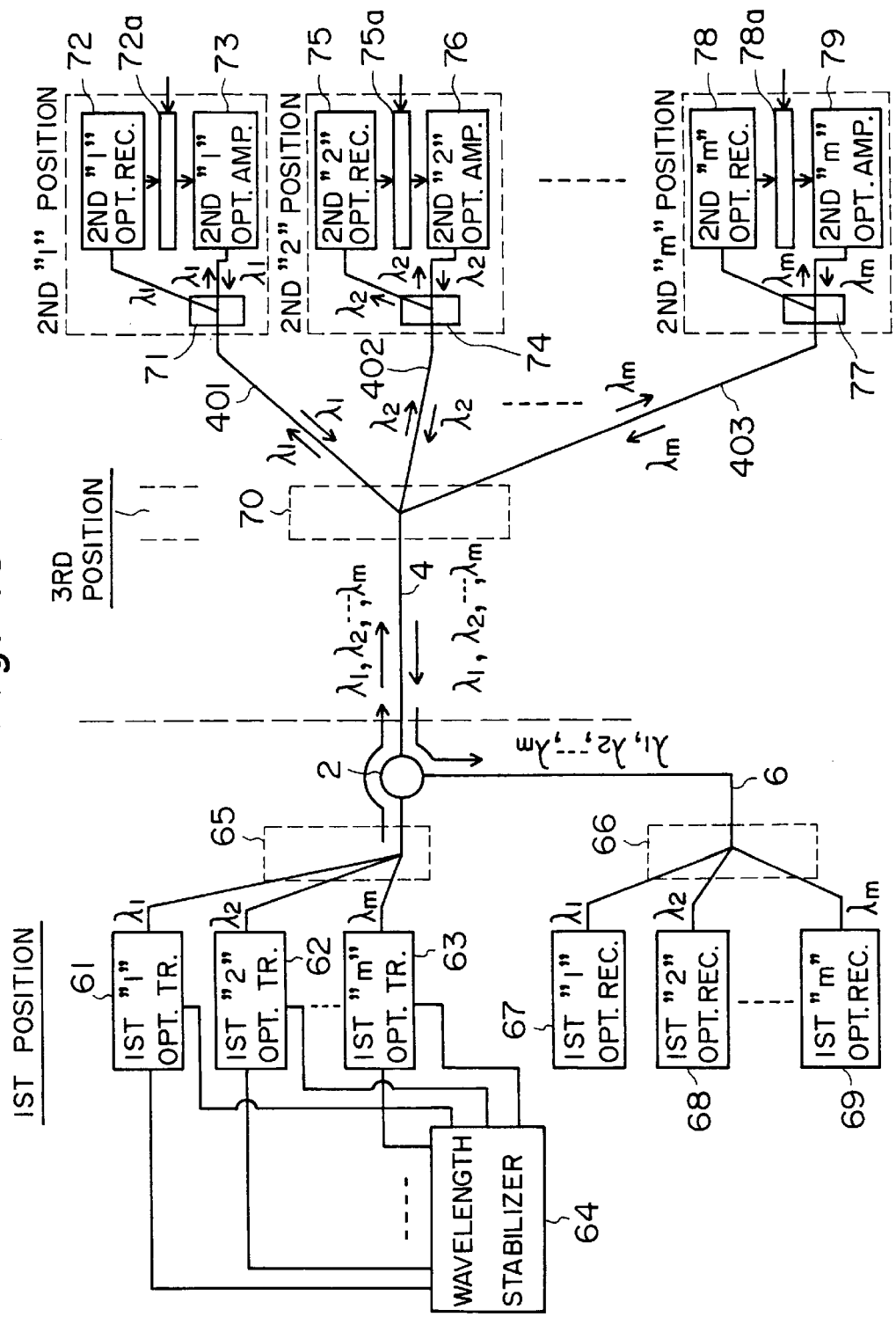
FIG. 10 is a block diagram illustrating an example of the structure of another embodiment of the present invention.

FIG. 10 illustrates in block form an embodiment of the present invention in case of wavelength-multiplexing. Reference numeral 61 denotes a first "1" optical transmitter which generates an optical signal of a wavelength $\lambda_1$, 62 a first "2" optical transmitter which generates an optical signal of a wavelength $\lambda_2$, 63 a first "m" optical transmitter which generates an optical signal of a wavelength $\lambda_m$, 64 a wavelength stabilizer for stabilizing the wavelength of the light source for the optical transmitters, 65 a first optical coupler-splitter for coupling down-link optical signals of wavelengths $\lambda_1$ to $\lambda_m$, 66 a second optical coupler-splitter for splitting up-link optical signals of the wavelengths $\lambda_1$ to $\lambda_m$, 67 a first "1" optical receiver which receives an up-link optical signal of the wavelength $\lambda_1$, 68 a first "2" optical receiver which receives the up-link optical signal of the wavelength $\lambda_2$, 69 a first-m optical receiver which receives the up-link optical signal of the wavelength $\lambda_m$, 70 a third optical coupler-splitter placed at a third position where a PDS node is provided, 401 a second "1" transmission line from the third optical coupler-splitter 70 to a subscriber at a second "1" position, 402 a second "2" transmission line to a subscriber at a second "2" position, 403 a second-m transmission line to a subscriber at a second "m" position, 71 a second "1" optical coupler-splitter in the subscriber's station at the second "1" position, 72 a second "1" optical receiver, 72a a second "1" control circuit, 73 a second "1" semiconductor laser amplifier, 74 a second "2" optical coupler-splitter in the subscriber's station at the second "2" position, 75 a second "2" optical receiver, 75a a second "2" control circuit, 76 a second "2" semiconductor laser amplifier, 77 a second "m" optical coupler-splitter in the subscriber's station at the second "m" position, 78 a second "m" optical receiver, 78a a second "m" control circuit, and 79 a second "m" semiconductor laser amplifier.

Referring to FIG. 10, the operation of the present invention will be described. Optical signals or pulses of m waves emitted from the first "1" optical transmitter 61 to the first "m" optical transmitter 63 are coupled by the first coupler-splitter 65, from which the coupled optical signal is provided via the optical circulator 2 to the optical fiber 4. The wavelength-multiplexed down-link optical signal is split by the third optical coupler-splitter 70 placed at the third position which is a PDS node, from which the optical signals of the wavelengths $\lambda_1$ to $\lambda_m$ are sent to the subscribers at the second "1" to second "m" positions, respectively. The down-link optical signals are partly split by the optical coupler-splitters 71, 74 and 77 and the split optical signals are each demodulated by one of the optical receivers 72, 75 and 78. The remaining down-link optical signals are fed to the semiconductor laser amplifiers 73, 76 and 79, at which they are controlled by the control circuits 72a, 75a and 78a as described previously with reference to FIGS. 1 and 2 to form up-link optical signals, which are retransmitted over the transmission line back to the third position as described previously with reference to FIGS. 1 and 2. The up-link optical signals thus formed in the respective subscribers' stations are coupled by the optical coupler-splitter 70 in the node into a composite optical signal, which is sent over the optical fiber 4 to the central office at the first position. The wavelength-multiplexed up-link optical signals are separated by the optical circulator 2 from the down-link optical signal and is split by the second optical coupler-splitter 66 into optical signals of the wavelengths $\lambda_1$ to $\lambda_m$ which are demodulated by the first "1" to first "m" optical receivers.

Figure 11:
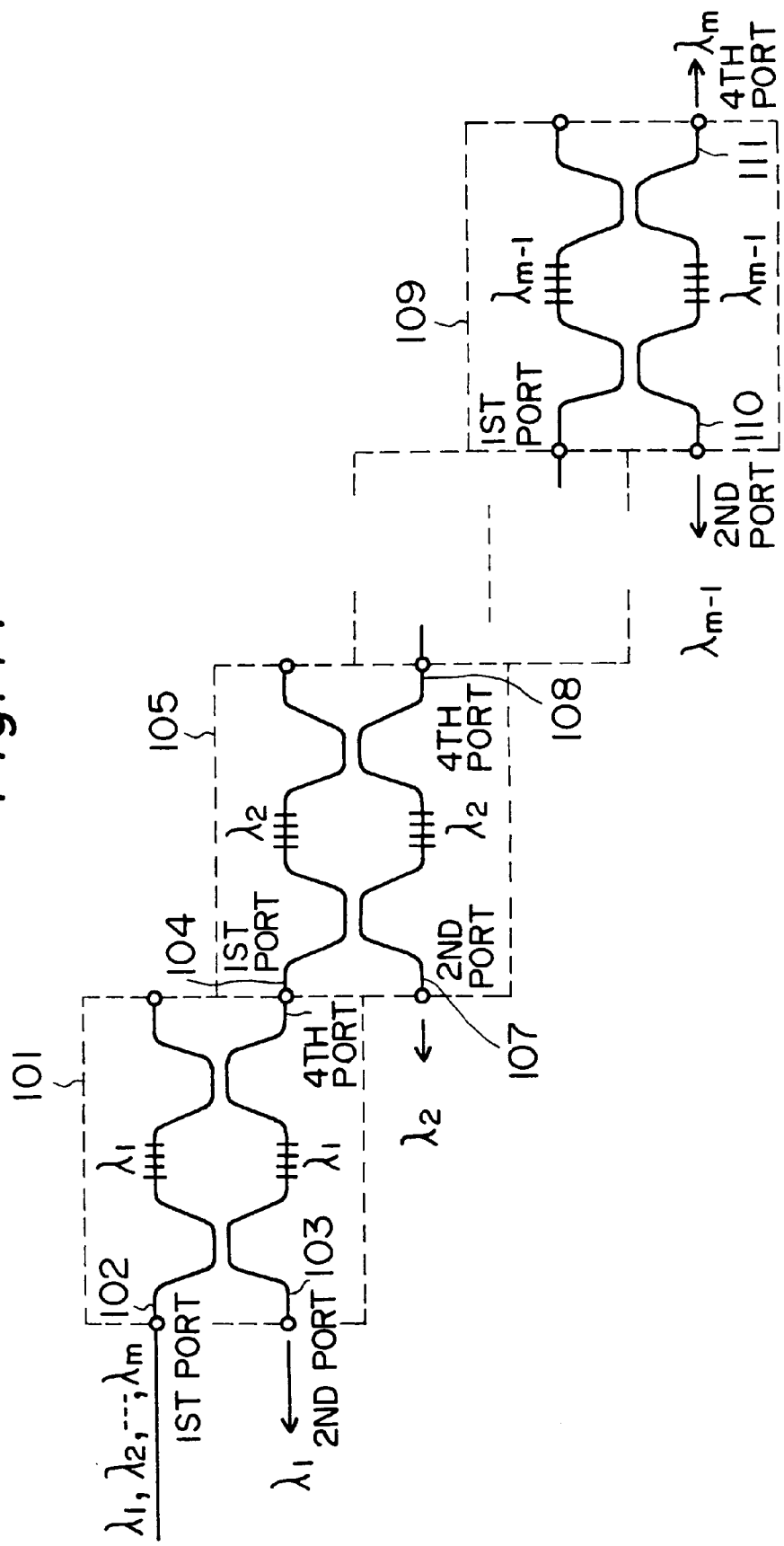
FIG. 11 is a diagram showing, by way of example, the constructions of optical coupler-splitter 65, 66 and 70 for use in the present invention.
Figure 12:
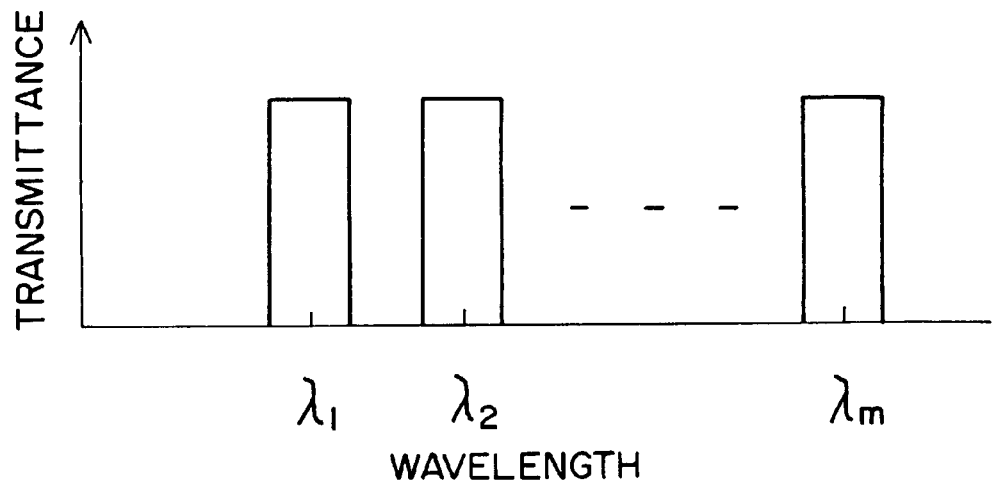
FIG. 12 is a graph showing the wavelength characteristic of the transmittance of each optical coupler-splitter depicted in FIG. 11.

FIG. 11 illustrates concrete examples of the optical coupler-splitters 65, 66 and 70, which are formed by a cascade connection of Mach-Zehender interferometer type optical coupler-splitters, each having diffraction gratings using one of 1 to m−1 as the Bragg wavelength and formed on two arms, respectively, as described previously in respect of FIG. 9. An optical signal obtaibed wavelength-multiplexing m waves of wavelength $\lambda_1$ to $\lambda_m$ enters a first port 102 of an optical coupler-splitter 101, which emits the optical signal of the wavelength $\lambda_1$ from a second port 103 and the other remaining optical signals of the wavelengths $\lambda_2$ to $\lambda_m$ from a fourth port 104. The fourth port 104 is connected to a first port of the next-stage optical coupler-splitter 105, which emits the optical signal of the wavelength $\lambda_2$ from a second port 107 and the other remaining optical signals of the wavelengths $\lambda_3$ to $\lambda_m$ from a fourth port 108. The following optical coupler-splitters each performs these operations; an optical coupler-splitter 109 of the final-stage emits light of the wavelength $\lambda_{m-1}$ from its second port 110 and light of the wavelength $\lambda_m$ from its fourth port 111. The wavelength characteristic of the transmittance of the optical coupler-splitter in FIG. 11 is shown in FIG. 12. It is desirable that the shape of the wavelength characteristic of the transmittance be rectangular so that the transmittance remains unchanged even if the wavelength of the light source or the transmission center wavelength of the optical coupler-splitter somewhat varies.

In a case of the up-link signal from each subscriber to the central office, the optical signal of wavelength $\lambda_1$ from the second "1" position enters the second port 103, the optical signal of wavelength $\lambda_2$ from the second "2" position enters the second port 107 and the optical signal of wavelength $\lambda_m$ from the second-m position enters the fourth port 111; these optical signals are emitted as a multiplexed signal from the first port 102.

Figure 13:
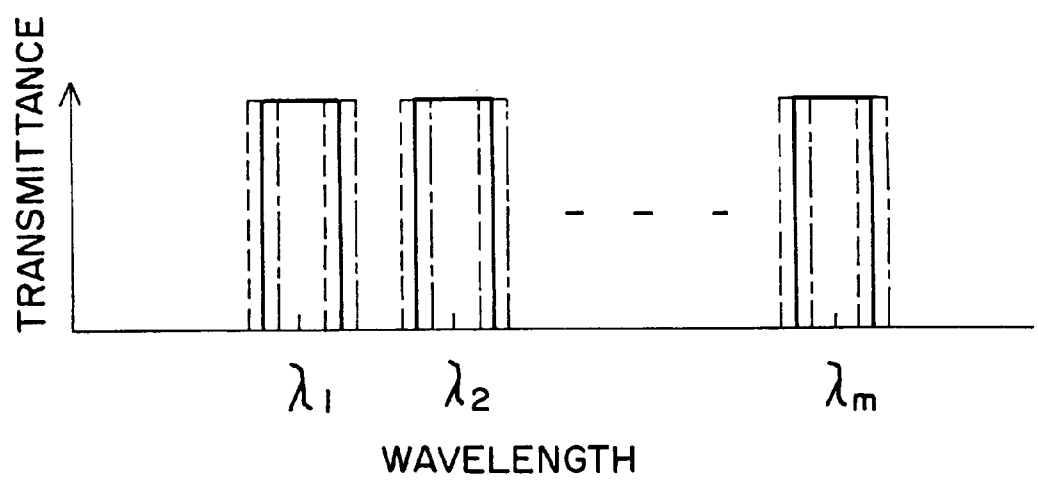
FIG. 13 is a graph showing one upon another the transmittance-wavelength characteristics of the optical coupler-splitters 65, 66 and 70.

The optical signals sent from the optical transmitters 61 to 63 placed at the first position (in the central office) are received by the optical receivers 67 to 69 after passing through a total of three optical coupler-splitters, that is, the first optical coupler-splitter 65 at the first position, the third optical coupler-splitter 70 in the node at the third position and the second optical coupler-splitter 66 at the first position. Properly speaking, the optical signals pass through the optical coupler-splitter in the subscriber's station, but this is ignored since the passing bandwidth of this optical coupler-splitter can be made wider than the passing bandwidths of the above-mentioned three optical coupler-splitters. In FIG. 13 there are shown, in a mutually overlapped manner, transmittance-wavelength characteristics of the three optical coupler-splitters, with their transmission center wavelengths slightly shifted. The overlapping portions of the characteristics of the three optical coupler-splitters are the passing bandwidths of the network in its entirety. It is necessary that the wavelengths of the optical transmitters at the first position fall within the overlapped zones of wavelengths. This calls for wavelength stabilization of the optical transmitters.

Figure 14:
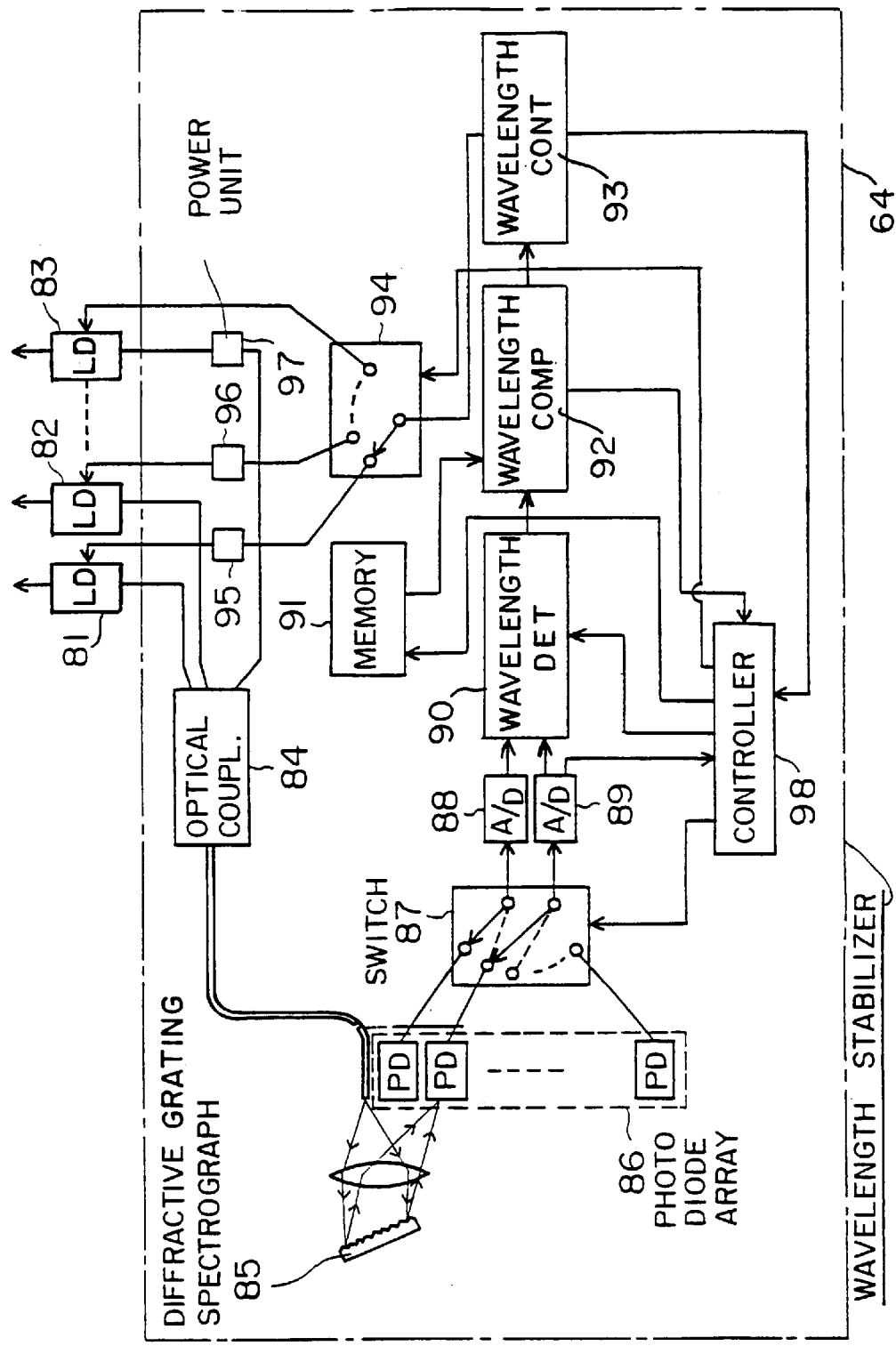
FIG. 14 is a block diagram of a wavelength stabilizer 64 for use in the present invention.

FIG. 14 illustrates in block form the wavelength stabilizer 64. A Japanese patent application has already been filed on this device (see Japanese Pat. Appln. No. 303395/95 entitled "Wavelength Stabilizer"). The outputs from semiconductor lasers 81 to 83 of the optical transmitters 61 to 63 are coupled together by an optical coupler 84 into a composite optical signal, which is reflected and diffracted by a diffracting grating spectrograph 85 to be split onto a photo diode array 86. Each of the photo diodes corresponds to one of the wavelengths used; hence, the wavelength of light can be known from the photo diode from which the light was emitted. A first switch 87 scans the outputs of the photo diodes to specify the photo diode irradiated by light. The output from such a light-irradiated photo diode is converted by either one of AD converters 88 and 89 to a digital signal, on which a wavelength detector 90 performs a logic operation to detect its wavelength. An originally required standard wavelength is read out of a memory 9 for standard wavelength information, then the read-out wavelength and the detected one are compared with each other by a wavelength comparator 92, and a control signal corresponding to a difference between them is fed from a wavelength controller 93 to a second switch 94. Responsive to a signal from a controller 98, the second switch 94 is switched to a terminal to that one of the semiconductor lasers which is to be controlled, and the control signal is fed to that one of power units 95 to 96 which generates a source current or voltage for controlling the output wavelength of the specified semiconductor laser. When the semiconductor lasers 81 to 83 are tunable lasers of the type that their output wavelength is controlled by a current injection thereinto, the current is generated in each of the power units 95 to 97, whereas when the output wavelengths of the semiconductor lasers 81 to 83 are controlled by temperature through the use of Peltier elements, the power units 95 to 97 generate currents for application to the Peltier elements. The temperature characteristic of the spectrograph of the type using diffraction gratings is 0.0005 nm/°C., and even if a temperature in the subscriber's station varies by 50° C., the wavelength fluctuation will be limited in a range of only 0.01 nm.

The use of the wavelength multiplexing system inevitably involves many optical coupler-splitters in the network. Though different according to its structure and the number of waves to be split, a single optical coupler-splitter normally produces an insertion loss of 5 dB or more;

accordingly, the total insertion loss by the three optical coupler-splitters is in excess of 15 dB. In the optical access system, the distance from the central office to the subscriber is around 10 km and 20 km for both ways. The optical amplifier, which is placed in the subscriber's station with a view to compensating for the loss by the transmission line and losses by respective coupling between devices and optical fibers, is particularly significant when the wavelength multiplexing system is employed. Functionally, an optical modulator can also be used in place of the optical amplifier.

Figure 15:
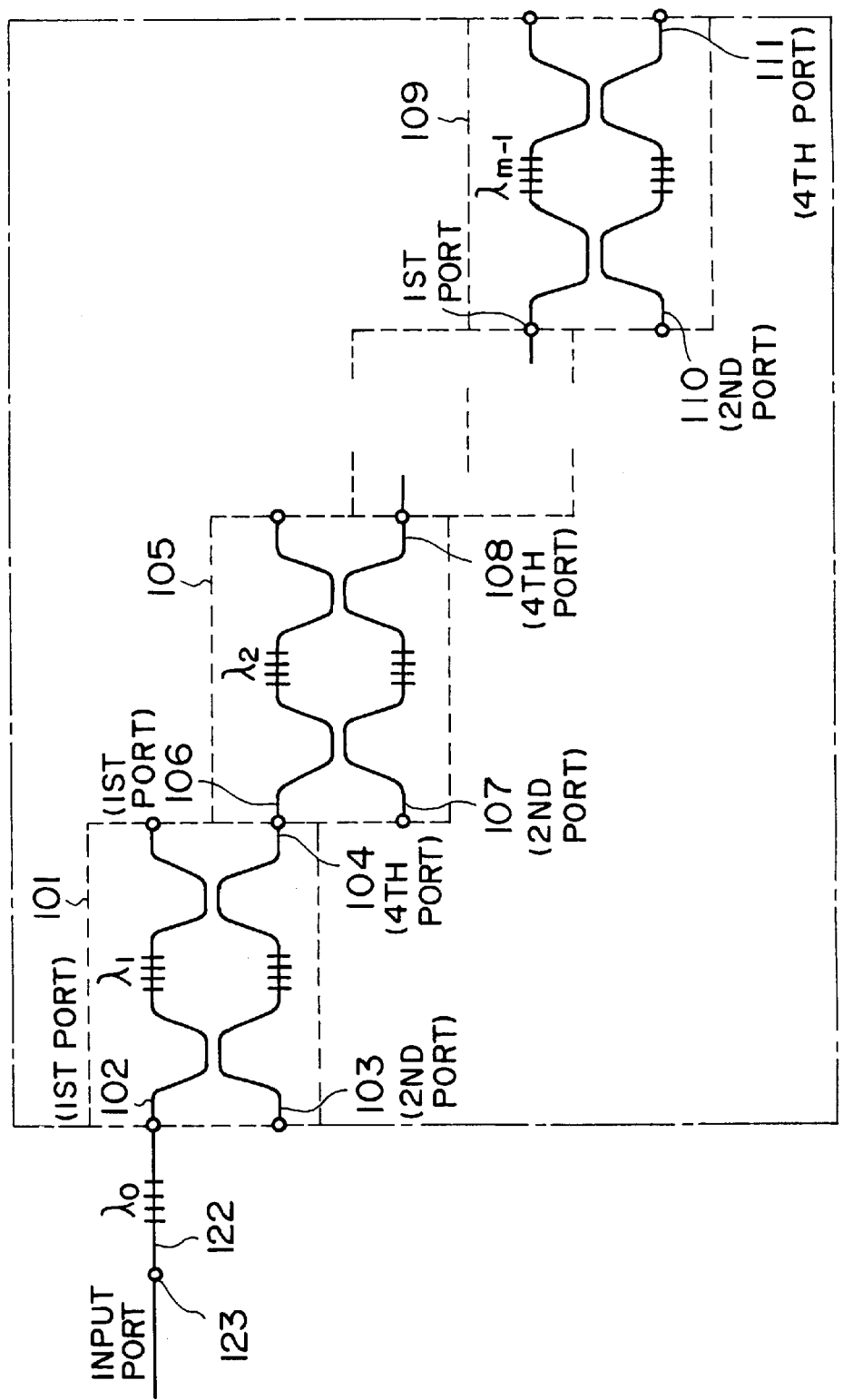
FIG. 15 is a circuit diagram illustrating an example of the optical coupler-splitter for use in the present invention.
Figure 16:
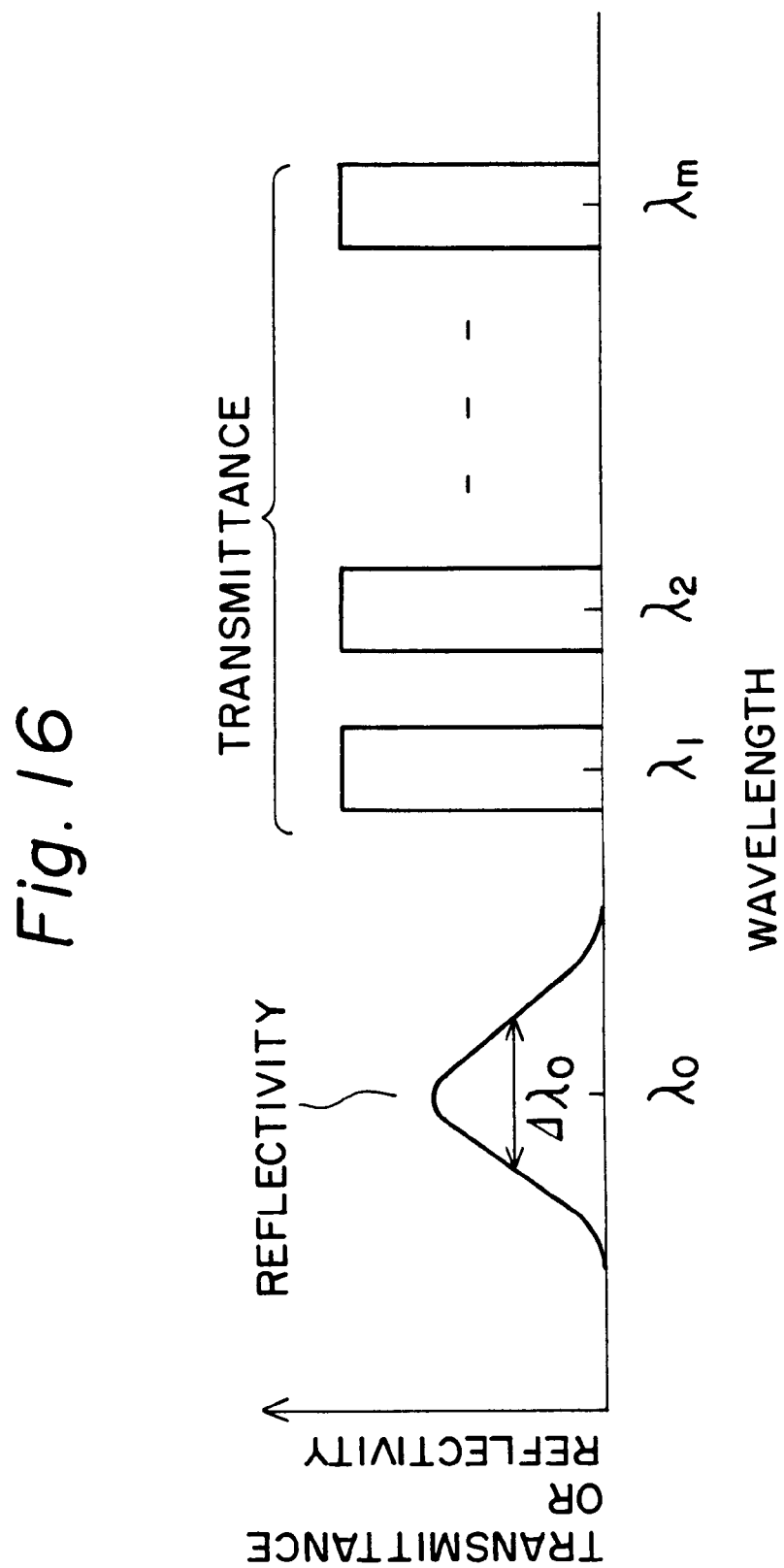
FIG. 16 is a graph showing wavelength characteristics of the reflectivity and transmittance of the optical coupler-splitter.

FIG. 15 illustrates an example of the system configuration of the present invention. A circuit surrounded by one-point chain lines is the same optical coupler-splitter shown in FIG. 11. This example shows an optical coupler-splitter in which an optical waveguide 122, which has a grating using the wavelength $\lambda_0$ as the Bragg wavelength, is connected to a first port 102 and an input port of the optical waveguide 122 is used as an input port 123. In FIG. 16 there are shown profiles of the transmittances of the wavelengths $\lambda_1$ to $\lambda_m$ and the reflectivity of the wavelength $\lambda_0$. The profiles of the transmittances of the wavelengths $\lambda_1$ to $\lambda_m$ are rectangular as referred to previously, whereas the profile of the reflectivity of the wavelength $\lambda_0$ takes the form of a Gaussian distribution which has a peak wavelength at $\lambda_0$. The half-amplitude levels of transmittance and reflectivity change with the value of the grating coupling coefficient and the rectangularity is improved by increasing the length of the grating. Further, the side lobe of the profile could be suppressed by distributing the refractive index of the grating, for example, in the form of a raised cosine function in the lengthwise direction of the optical waveguide.

Figure 17:
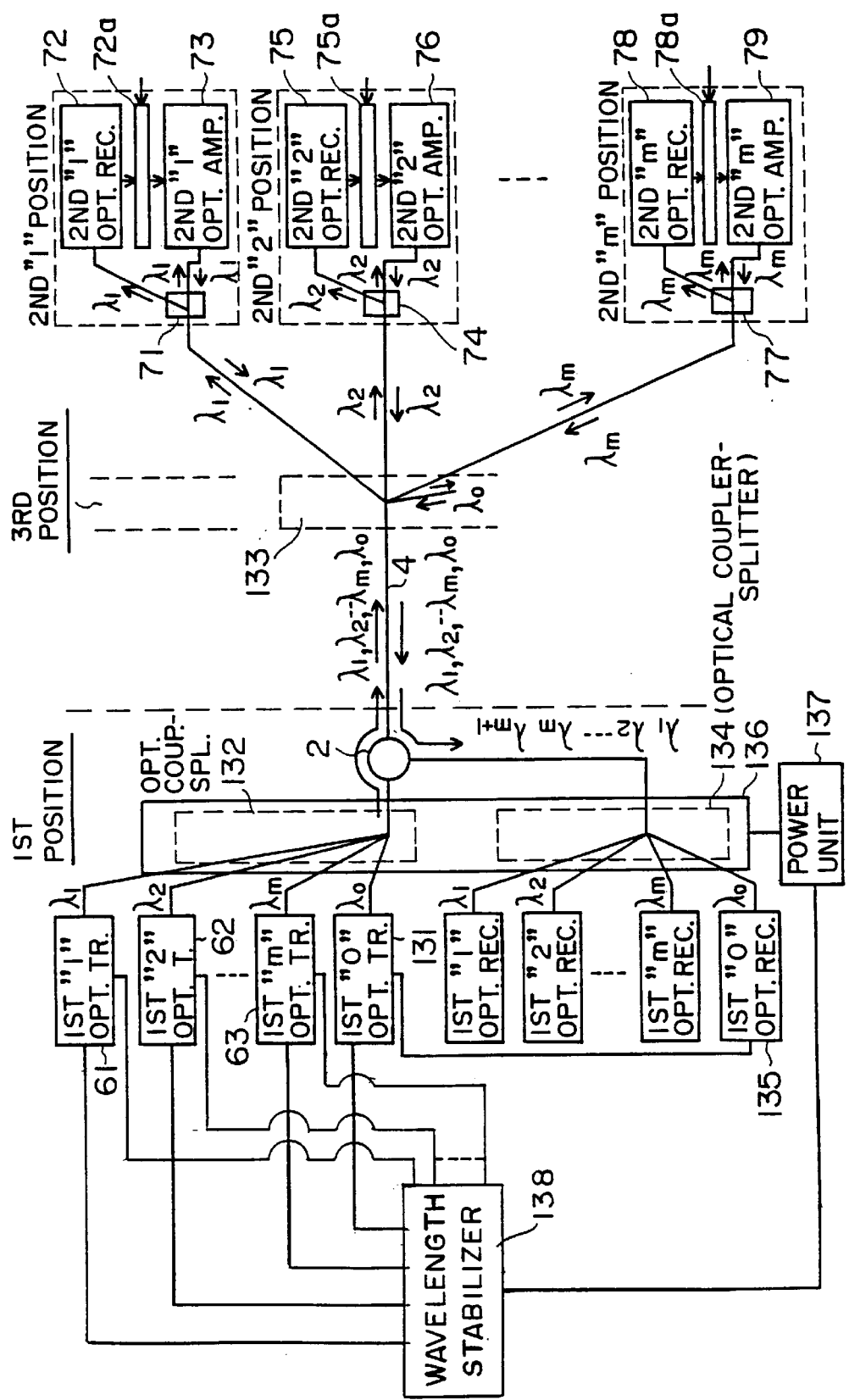
FIG. 17 is a block diagram illustrating the structure of an embodiment of the present invention.

FIG. 17 is a block diagram illustrating an embodiment of the present invention. In FIG. 17, a first "0" optical transmitter 131 which generates an optical signal of the wavelength $\lambda_0$ is added to the FIG. 10 embodiment and (m+1) optical signals of the wavelengths $\lambda_0$ to $\lambda_m$ are coupled together by an optical coupler-splitter 132 into a composite optical signal, which is provided via the optical circulator 2 to the optical fiber 4. As a third optical coupler-splitter in the node at a third position, an optical coupler-splitter 133 is used which has the structure depicted in FIG. 15. The optical signal of the wavelength $\lambda_0$ is reflected there and is coupled to up-link optical signals of the wavelengths $\lambda_1$ to $\lambda_m$ from subscribers and returned to the first position. The up-link optical signals of the wavelengths $\lambda_0$ to $\lambda_m$ are separated by the optical circulator 2 from the down-link optical signals, thereafter being split by an optical coupler-splitter 134 to respective optical receivers.

The optical signal of the wavelength $\lambda_0$ is used to monitor a wavelength shift of the optical coupler-splitter 133 through utilization of its reflection characteristic at the wavelength $\lambda_0$ (FIG. 16). The optical coupler-splitter 133 is fabricated by forming a diffraction grating in a three-dimensional optical waveguide of quartz glass or in a quartz glass fiber. Letting the equivalent refractive index of the optical waveguide of the wavelength $\lambda_m$ and the pitch of the diffraction grating be represented by $N_m$ and $\Lambda_m$ respectively, the following relation is obtained.

$$\lambda_m = 2 \cdot \Lambda_m \cdot N_m \quad (1)$$

The temperature change at this wavelength is given by the following equation.

$$\delta\lambda_m/\delta T = 2 \cdot \Lambda_m \cdot \delta N_m/\delta T \quad (2)$$

Assuming that the wavelength $\lambda_m$ is in a 1.55 µm band, $\Lambda_m$ is about 0.534 µm. Approximating the temperature change $\delta N_m/\delta T$ by that $1.1 \times 10^{-5}$ (1/°C.) of the refractive index of the quartz glass gives $$\delta\lambda_m/\delta T = 1.2 \times 10^{-2} (\text{nm}/°\text{C.}) \quad (3)$$

A temperature change of 100° C. will cause a 1.2 nm wavelength shift. The wavelength range from $\lambda_0$ to $\lambda_m$ is assumed to be around 30 nm, the above-mentioned optical coupler-splitter can be handled as one that shifts its wavelength uniformly within that range. Then the optical signal of the wavelength $\lambda_0$ is used to detect the amount of wavelength shift of the optical coupler-splitter 133 which is caused by an environmental temperature change.

Figure 18:
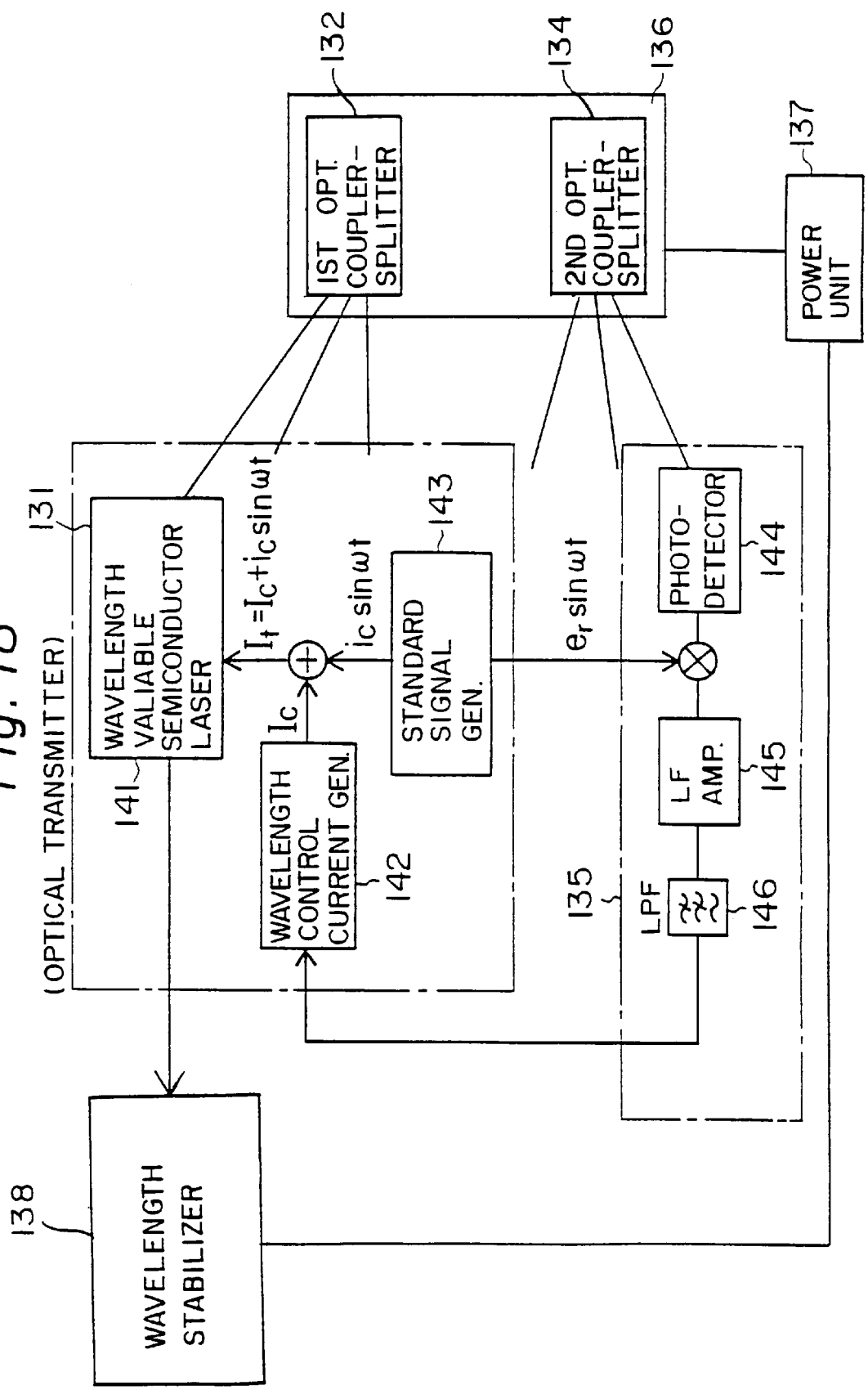
FIG. 18 is a block diagram illustrating examples of the associated parts of an optical transmitter 131, an optical receiver 135, a first optical coupler-splitter 132, a second optical coupler-splitter 134 and a wavelength stabilizer 138.

In FIG. 18 there are shown in block form associated parts of the optical transmitter 131, the optical receiver 135, the first optical coupler-splitter 132 whose wavelength shift can be controlled, the second optical coupler-splitter 134 and a C wavelength stabilizer 138. The optical coupler-spritters 132 and 134 are each mounted on a Peltier element 136 and their wavelength shifts are controlled by controlling the temperature of the Peltier element by a control power unit 137.

Figure 19:
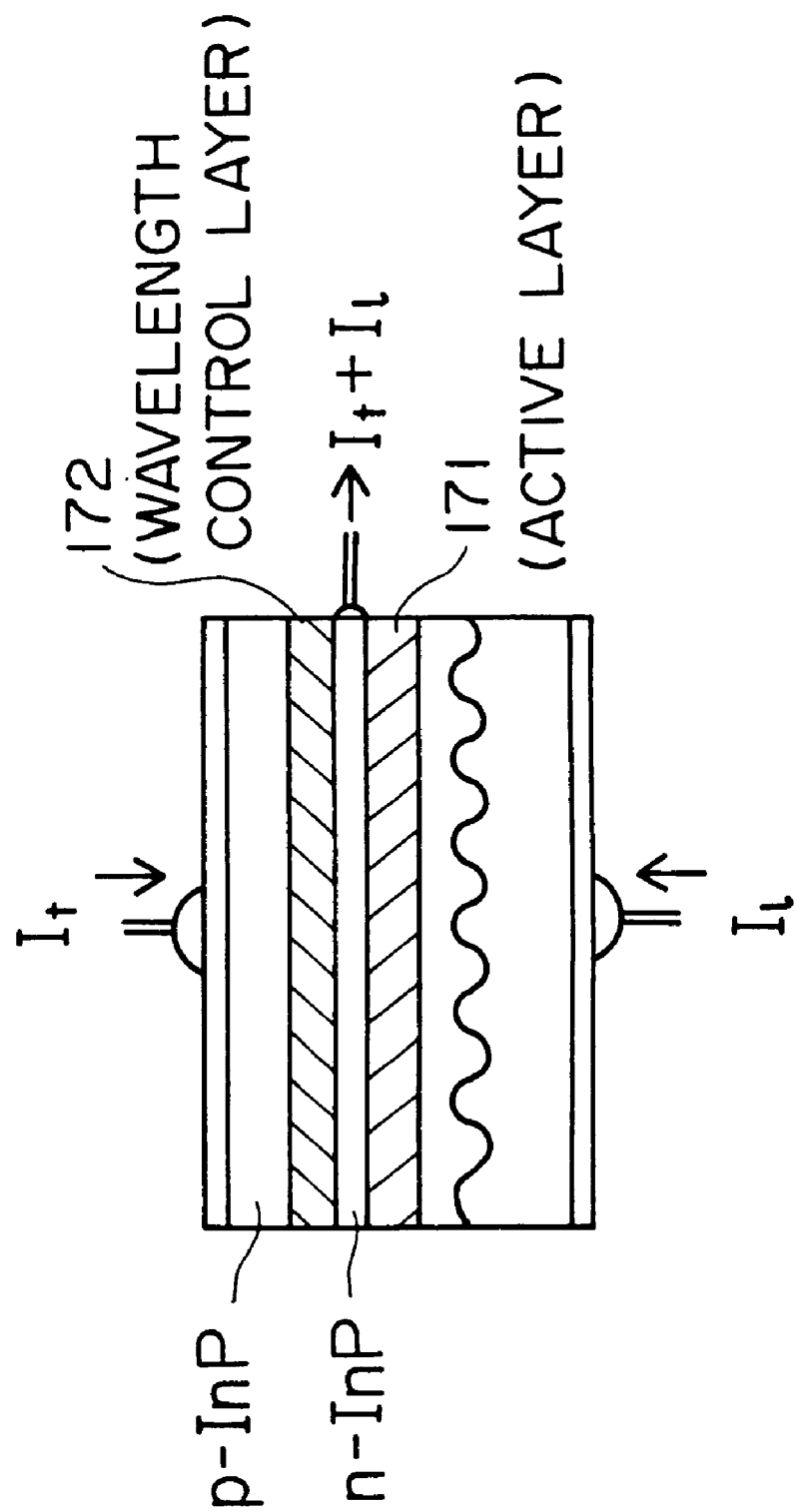
FIG. 19 is a schematic sectional view showing an example of a wavelength variable semiconductor laser for use in the present invention.
Figure 20:
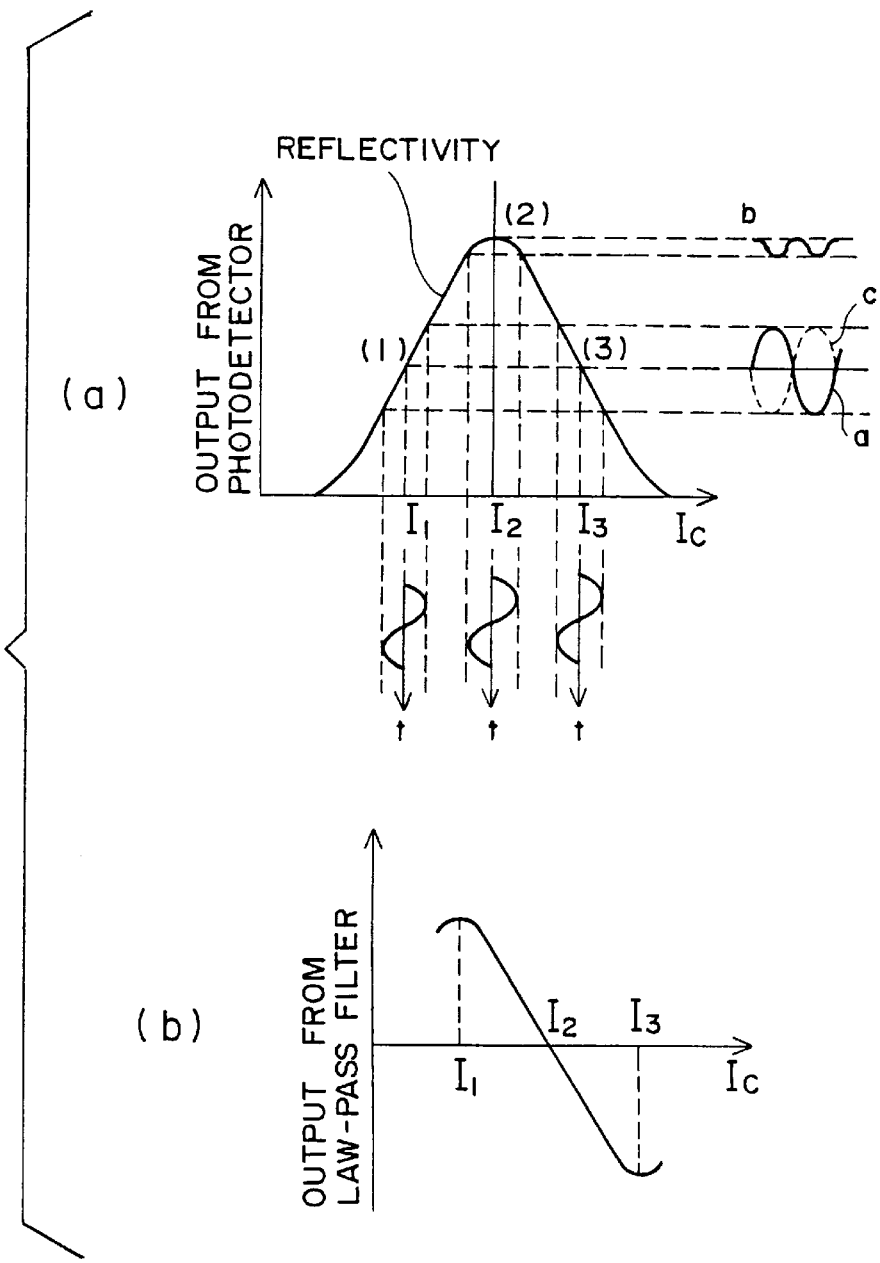
FIG. 20 is a graph showing the relationships of the photodetector output (a) and the low-pass filter output (b) in the optical receiver 135 to a wavelength control current $I_c$ which is applied to a wavelength variable semiconductor laser 141.

The optical transmitter 131 uses a wavelength variable semiconductor laser 141. FIG. 19 illustrates in section a TTG (Tunable Twin-Guide) laser as an example of the wavelength variable semiconductor laser 141. The laser oscillates on a current $I_1$ which is applied to an active layer 171 and the wavelength of oscillation is controlled by a current $I_t$ which is applied to a wavelength control layer 172. The current $I_t$ is produced by superimposing a low-frequency current component $i_c \sin \omega t$ of a frequency as low as tens of kilohertz generated by a standard signal generator 143 on a direct current $I_c$ generated by a wavelength control current generator 142. The optical signal of the wavelength $\lambda_0$ is reflected by the third optical coupler-splitter 133 of the node at the third position and is received by the optical receiver 135. The output from a photodetector 144 is multiplied by a standard signal $e_r \sin \omega t$ which is generated by the standard signal generator 143 and is in phase with the low-frequency component $i_c \sin \omega t$. As shown at (a) in FIG. 20, when the current $I_c$ is varied in the order $I_1$-$I_2$-$I_3$, the oscillation wavelength of the laser 141 varies correspondingly and output waveform from the photodetector 144 becomes such as indicated by a, b and c; the output a is in phase with the standard signal $e_r \sin \omega t$, the output c is 180 out of phase and the output b is 2 $\omega$. Applying such an output to a low-pass filter 146 of a cutoff frequency lower than after amplifying it by a low-frequency amplifier 145, the low-pass filter 146 generates such an output as shown at (b) in FIG. 20 with respect to the current $I_c$. The wavelength control signal $I_c$ is generated by the wavelength control current generator 142 so that the output from the low-pass filter 146 is reduced to zero, then the standard signal $I_c \sin \omega t$ is superimposed on the wavelength control signal $I_c$ and the composite signal is fed back to the laser 141.

Figure 21:
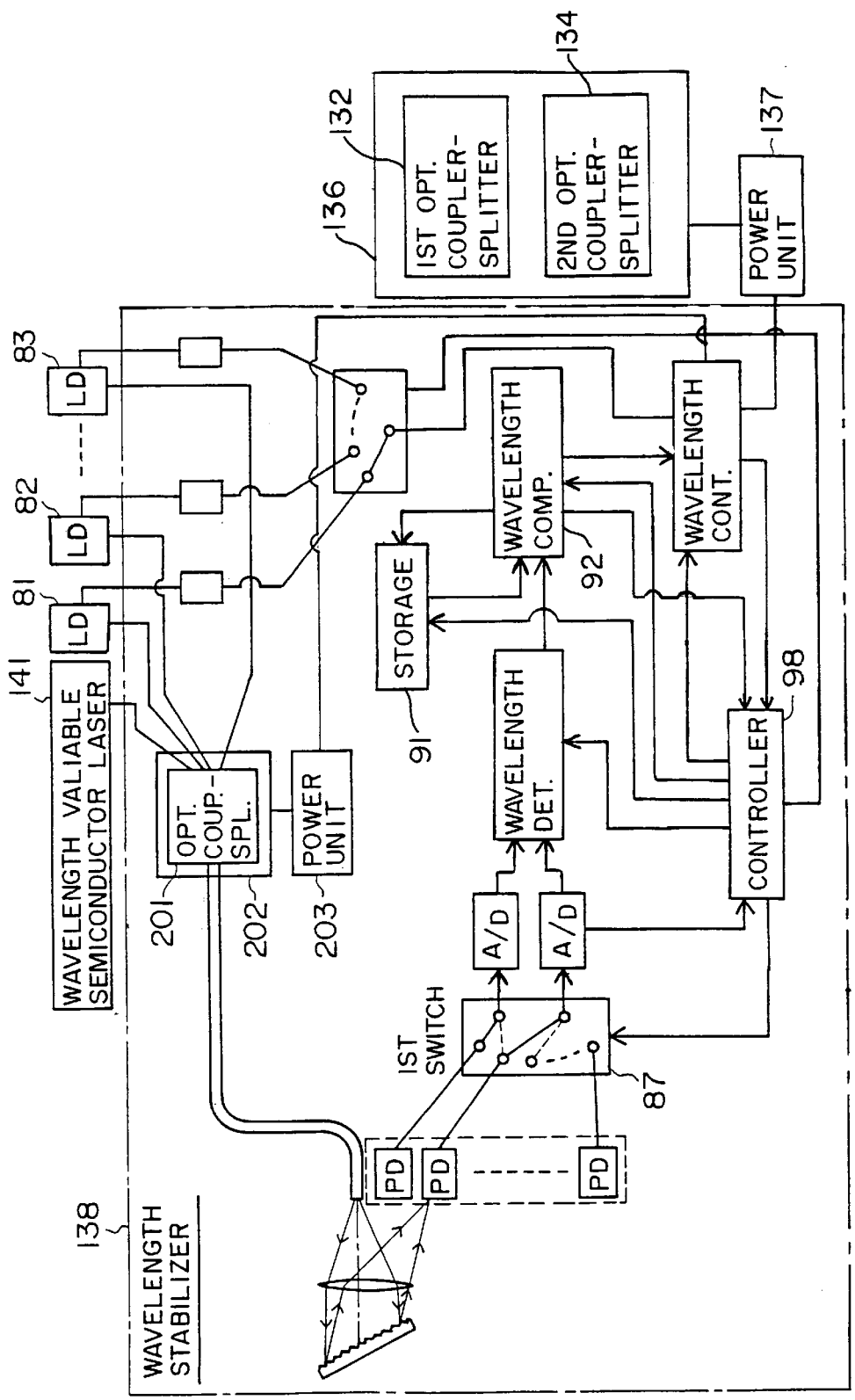
FIG. 21 is a block diagram illustrating an example of the wavelength stabilizer 138.
Figure 22:
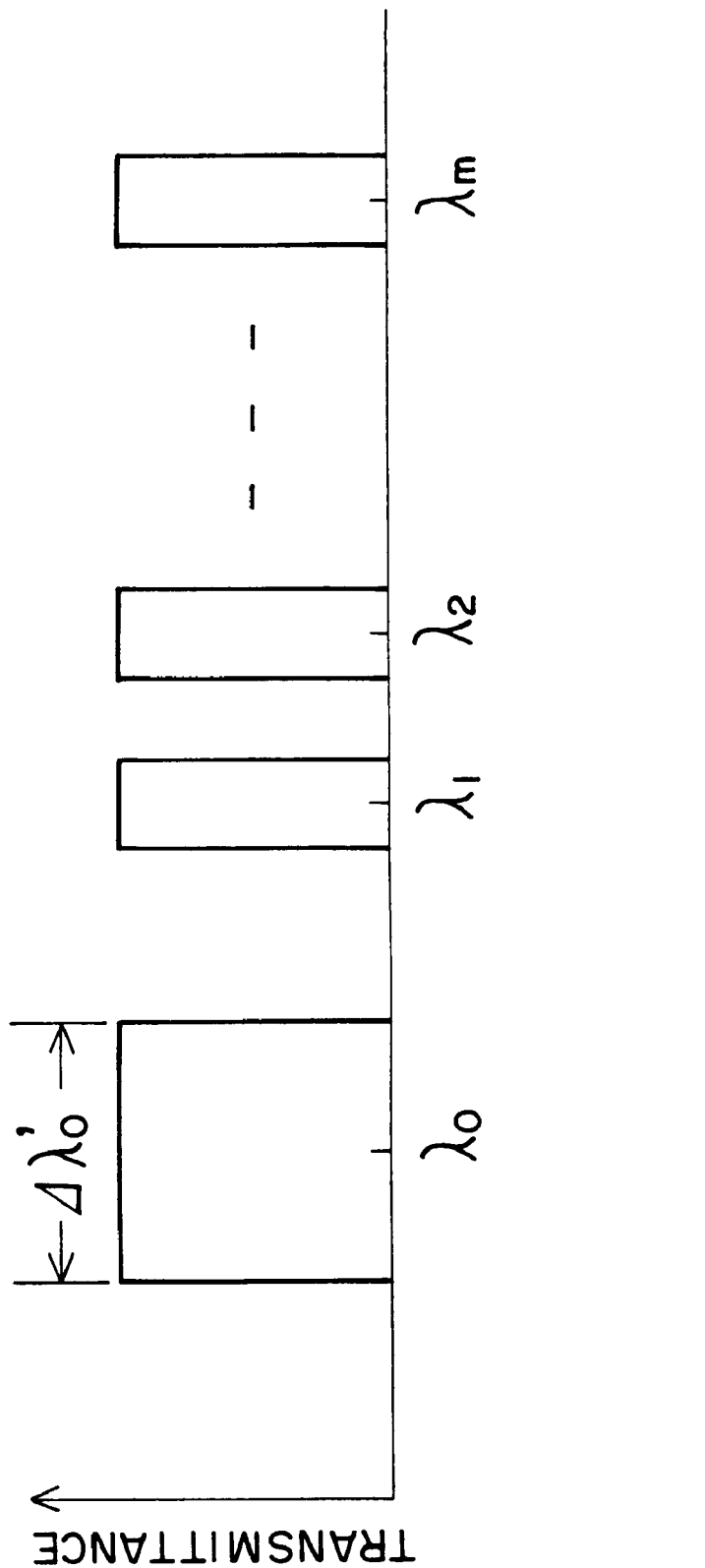
FIG. 22 is a chart showing the wavelength characteristic of the transmittance of an optical coupler-splitter 201 for use in the present invention.

FIG. 21 illustrates in block form the wavelength stabilizer 138. A description will be given of modifications from the wavelength stabilizer 64 shown in FIG. 14. An optical coupler-splitter 201 is mounted on a Peltier element 202 and is temperature controlled by a power unit 203. In FIG. 22 there is shown a transmittance-wavelength characteristic of the optical coupler-splitter 201. This corresponds to FIG. 16. The passing band width $\Delta\lambda_0'$ for the wavelength $\lambda_0$ of the wavelength variable semiconductor laser 141, which is a light source of the first "0" optical transmitter 131, is required to pass therethrough any shifts of the wavelength $\lambda_0$, and hence it needs to be larger than the band width $\Delta\lambda_0$ in FIG. 16. The passing band width $\Delta\lambda$ is determined dependent on the maximum predicted shift in the output wavelength of the third optical coupler-splitter 133 by an ambient temperature change. Assuming that the wavelength has changed from $\lambda_0$ to $\lambda_m$ the first switch 87 responds to an instruction from the controller 98 to detect, by scanning, the output from the photo diode on which the optical signal of the wavelength $\lambda_0$ is impinging. The signal thus detected is compared by the wavelength comparator 92 with a standard wavelength signal pre-registered in a storage 91 of standard wavelength information; if a mutual difference is zero, the wavelength comparator 92 sends a signal to the controller 98, which responds to it to send an instruction to the first switch 87 for the next scanning. If a difference is detected in the wavelength comparator 93, a control signal corresponding to the difference is applied to the power units 203 and 137 to control the Peltier elements 202 and 136, changing the wavelength characteristics of the optical coupler-splitters 201, 132 and 134. At the same time, a difference signal is applied from the wavelength comparator 92 to the storage 91 for standard wavelength information to shift the prestored standard wavelength signals of the wavelengths $\lambda_0$ to $\lambda_m$ by the value of the difference signal. Upon completion of this process, the wavelength comparator 92 sends a signal to the controller 98, which responds to the signal to send an instruction to the first switch 87 for the next scanning, thereby controlling the wavelengths of the light sources for the first "1" to first "m" optical transmitters 61 to 63 as described previously.

Figure 23:
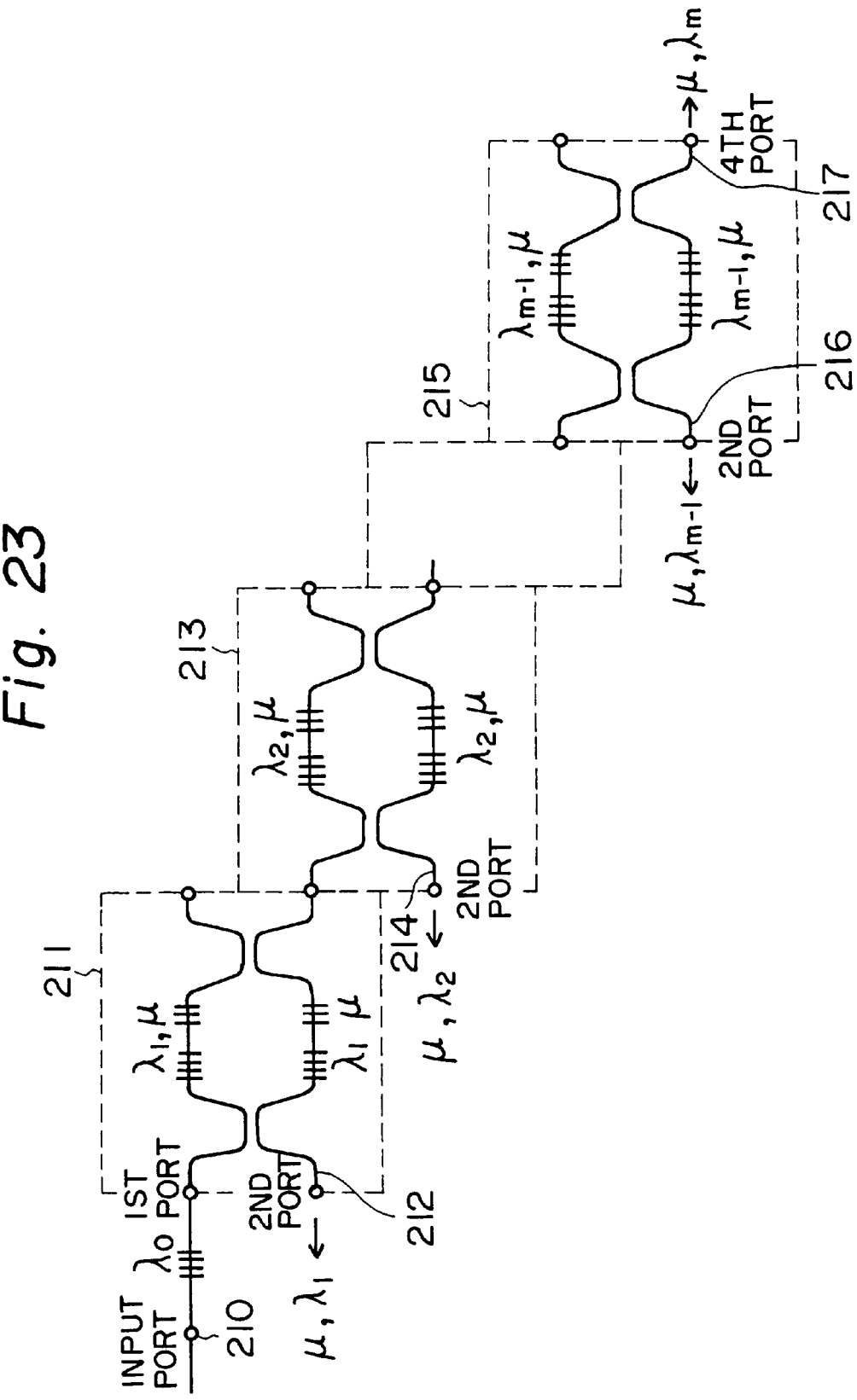
FIG. 23 is a circuit diagram showing an example of the optical coupler-splitter for use in the present invention.

FIG. 23 illustrates another embodiment of the present invention. Unit optical coupler-splitters 211, 213 and 215 of this optical coupler-splitter assembly are identical in construction with the Mach-Zehender interferometers (optical coupler-splitters) 101, 105 and 109 forming the optical coupler-splitter assembly of FIG. 15 except that each optical coupler-splitter has gratings of a Bragg wavelength $\mu$ and a reflectivity of one of R1 to Rm on two arms. Upon incidence of the optical signals of the wavelengths $\mu, \lambda_0, \lambda_2, \ldots, \lambda_m$ on an input port 210, the optical coupler-splitter 211 outputs the optical signals of the wavelengths $\mu$ and $\lambda_1$ from its second port 212, the optical coupler-splitter 213 the optical signals of the wavelengths $\mu$ and $\lambda_2$ from its second port 214, the optical coupler-splitter 215 the optical signals of the wavelengths $\mu$ and $\lambda_{m-1}$ from its second port 216 and the optical signals of the wavelengths $\mu$ and $\lambda_m$ from its fourth ports 217.

Figure 24:
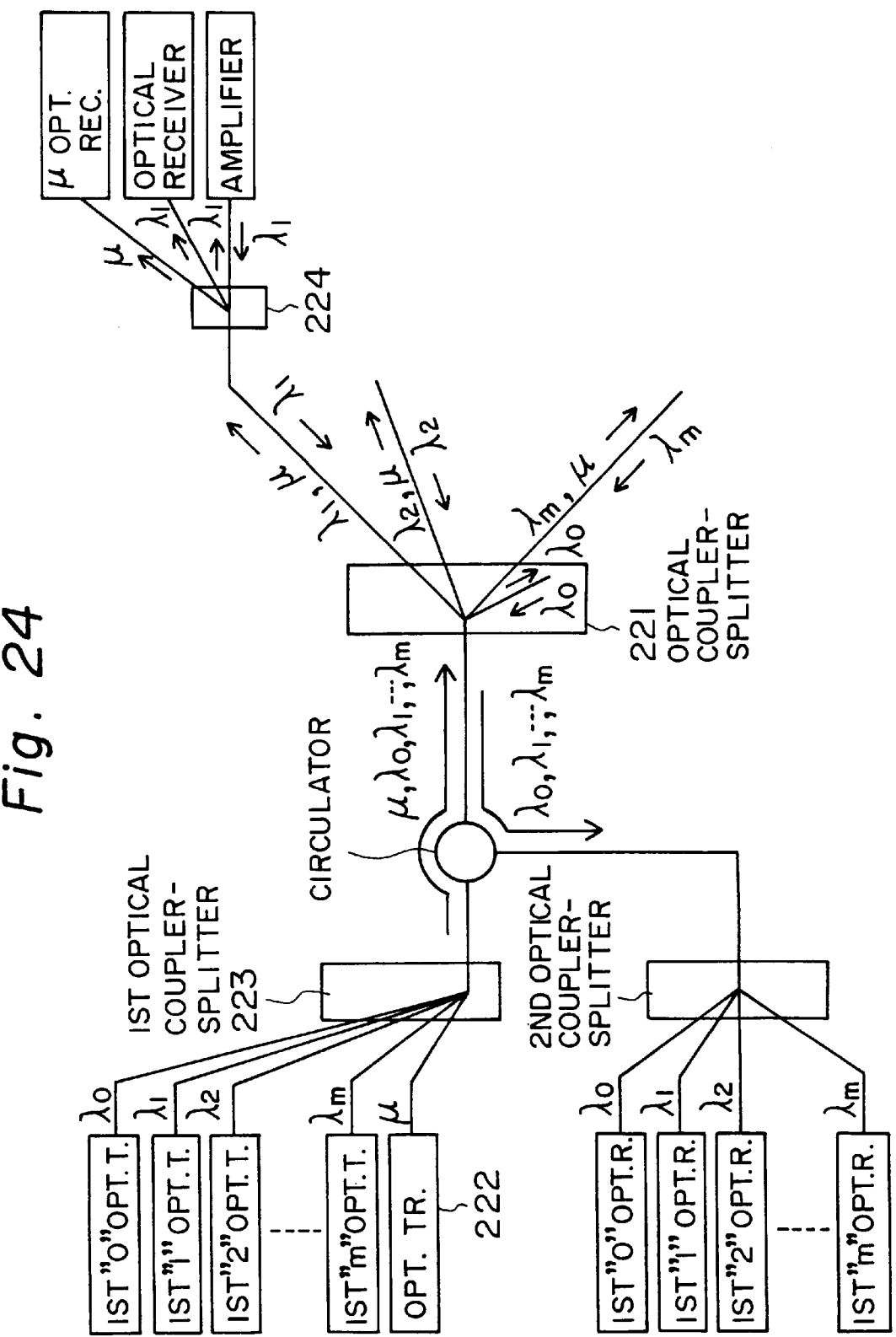
FIG. 24 is a block diagram illustrating an example of the system.
Figure 25:
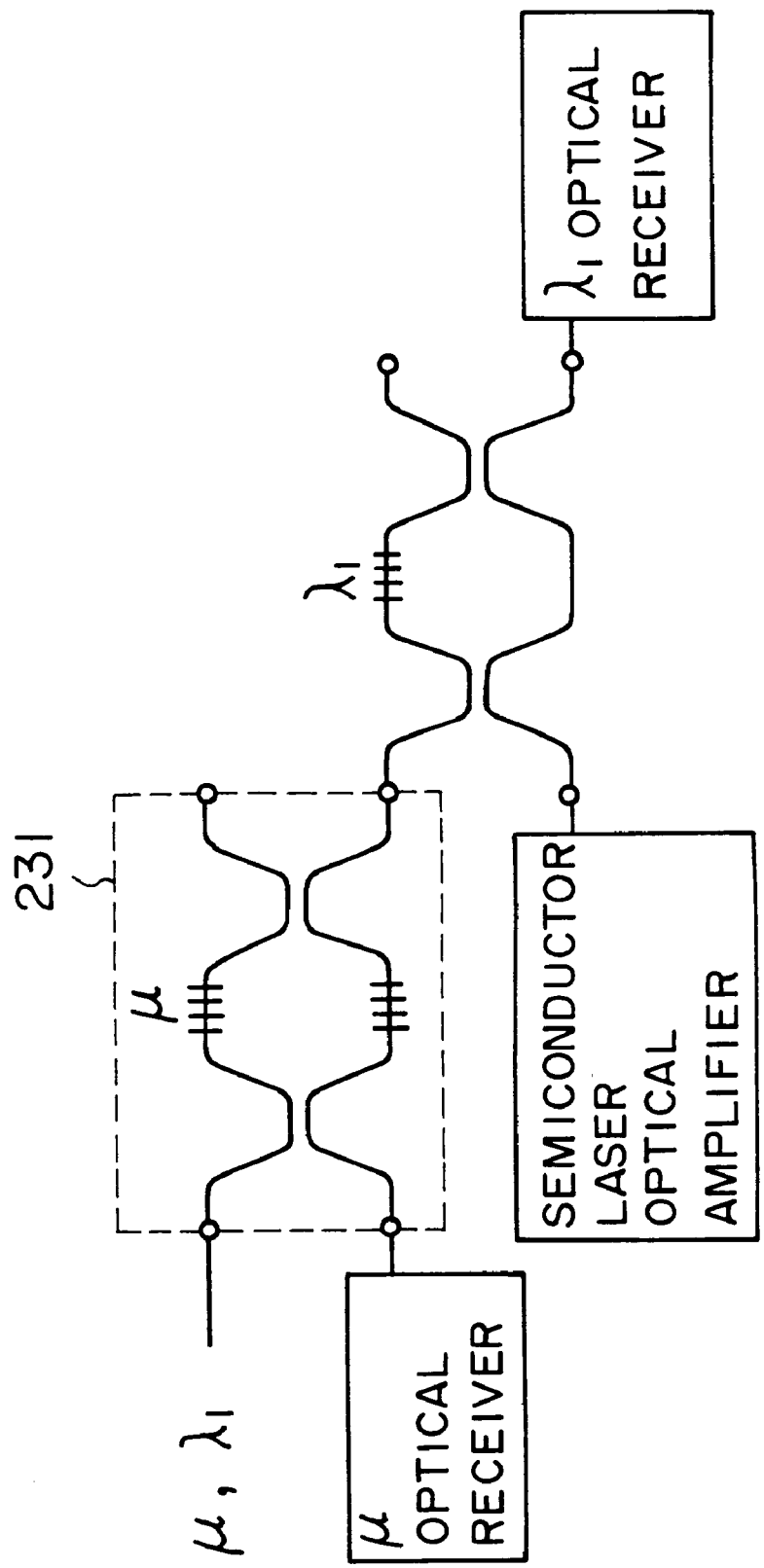
FIG. 25 is a diagram showing the a structure of an optical coupler-splitter 224 for use in the present invention.
Figure 27:
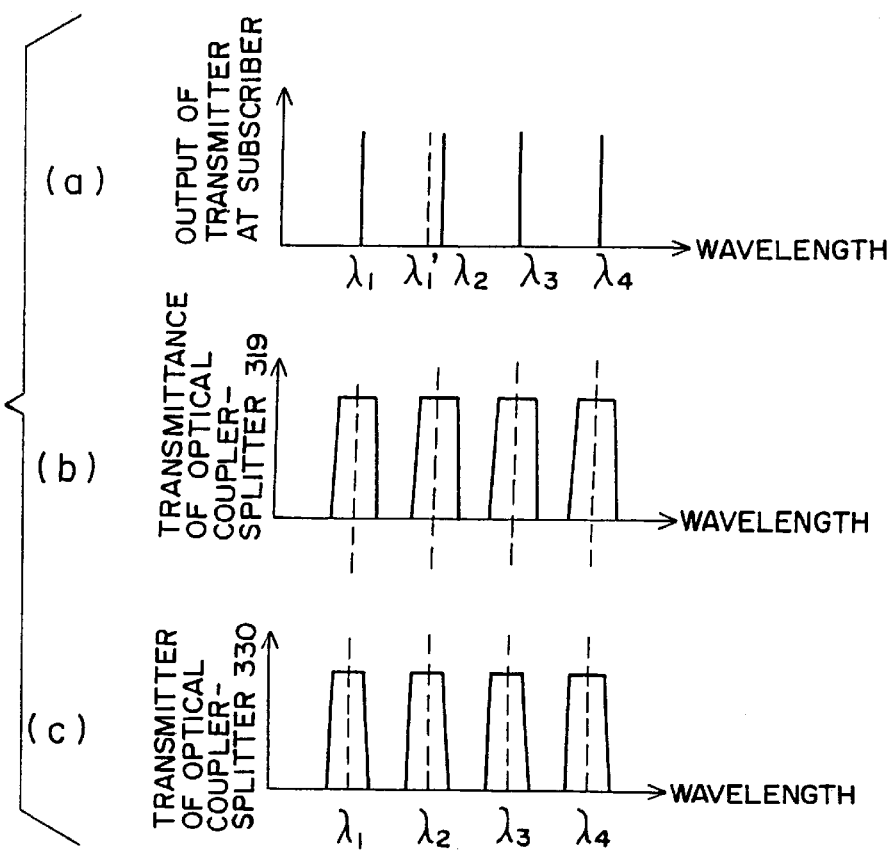
FIG. 27 is a diagram explanatory of shortcomings of the conventional system.
Figure 28:
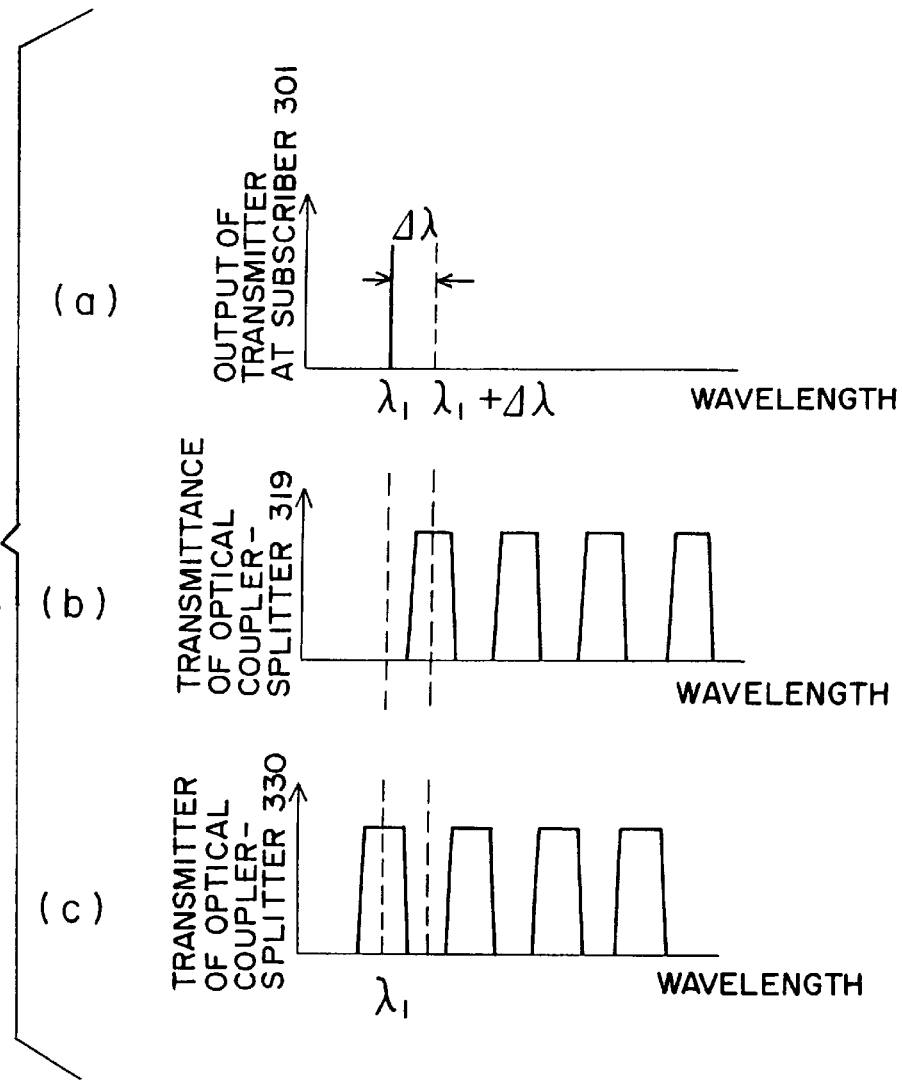
FIG. 28 is a diagram explanatory of other shortcomings of the conventional system.

FIG. 24 illustrates in block form another embodiment of the present invention. An optical transmitter 222 for transmitting the opticalsignal of the wavelength $\mu$ is placed at the first position on the part of the central office and a first optical coupler-splitter 223 is equipped with a function of coupling optical signals of the wavelengths $\mu, \lambda_0, \lambda_1, \lambda_2, \ldots, \lambda_m$. Further, a third optical coupler-splitter 221 at the third position is an optical coupler-splitter described with reference to FIG. 23. For example, in the subscriber's station at the second "1" position, a second "1" optical coupler-splitter 224 is a coupler-splitter which splits the optical signals of both of the wavelengths $\lambda_1$ and $\mu$ as shown in FIG. 25. As a result, the signal of the wavelength $\mu$ can be distributed as a broadcast wave to each subscriber. With such a network configuration, it is possible to simultaneously offer communication and broadcasting services through a single optical network.

As described above in detail, the system of the present invention possesses merits listed below.

(1) Since a semiconductor laser amplifier of a large full width at half maximum is placed in the subscriber's station, there is no need of effecting control like wavelength stabilization of the semiconductor laser.

(2) The optical access network using the wavelength multiplexing system inevitably involves the use of several optical coupler-splitters. The optical amplifier placed in the subscriber's station is effective in compensating for their insertion losses and in securing the operating margin of the system.

(3) In each PDS network the transmission lines from the central office to the node and from the node to the subscriber's station are each formed by one optical fiber to make the system economical.

(4) In response to a particular request, the message or information speed can be set within the range of the maximum value which is a combination of the message speed of an up-link signal and the message speed of a down-link signal; this well matches with the ATM system, too.

(5) A mechanism is provided which permits automatic detection of and recovery from a transmission failure on the PDS network.

(6) The wavelength control of the network is effected on the part of the central office alone, and hence the PDS node and the subscriber side can be made maintenance-free.

(7) Both communication and broadcasting services can be offered on the same optical network, and hence multimedia services can be dealt with.

(8) With these advantages, it is possible to provide an economical subscriber terminal and an economical, stable and easy-to-maintain optical access system.

What we claim is:

1. An optical access system characterized in:
that a bilateral optical transmission line of a single optical fiber is provided between a first and a second position;
that there are provided at said first position means for generating an optical digital signal of a p-bit/sec transmission rate by an optical transmitter as a down-link optical signal of a wavelength to said second position, for making optical pulses of said optical digital signal "1s" at every n-th (n being an integer equal to or greater than 2) bits, for forming down-link information from said first position to said second position by removing from said optical signal said "1" optical pulses at said every n-th bits, and for forwarding said down-link information to a bilateral optical transmission line as an optical digital signal of said p-bits/sec transmission rate;
that there are provided at said second position: optical splitter-coupler means connected to said bilateral optical transmission line for splitting a part of said down-link optical signal transmitted to said second position; an optical receiver connected to said optical splitter-coupler means for receiving said part split from said down-link optical signal, for extracting a train of said optical pulses of said every n-th bits and taking out said p-bit/sec optical digital signal except said optical pulses of said every n-th bits as said down-link information after demonstrating said down-link information; terminal means for receiving up-link message data from said second position to said first position; an optical gate circuit on which the remaining part of said down-link optical signal is incident from said optical splitter-coupler and turned back to the same optical splitter-coupler; and control means connected to said optical receiver, said terminal means and said optical gate circuit for turning ON and OFF said optical gate circuit in synchronization with said optical pulses of said every n-th bits in accordance with the presence or absence of pulses of said up-link message data to permit and inhibit the passage through said optical gate circuit of said optical pulses of said every n-th bits of said down-link optical signal incident on said optical gate circuit to form an up-link optical signal and forwards said up-link optical signal from said optical gate circuit to said bilateral optical transmission line through said optical splitter-coupler; and that there are further provided at said first position: separation means connected to said bilateral transmission line for separating from said bilateral transmission line said up-link optical signal transmitted from said second position; and an optical receiver connected to said separation means for receiving said separated up-link optical signal.

2. An optical access system using a wavelength-multiplex bilateral optical transmission line between a first position to a plurality m of second positions, characterized in:

that a first bilateral optical transmission line for wavelength-multiplex transmission is provided between said first position and a third position halfway from said first position to said plurality m of second positions; a plurality m of second bilateral optical transmission lines are provided between said third point and said plurality m of second positions in correspondence therewith; and said first bilateral optical transmission line and said plurality m of second bilateral optical transmission lines are interconnected via a third optical coupler-splitter to form an optical transmission line system in which wavelength-multiplexed optical signals of wavelengths $\lambda_1$ to $\lambda_m$ transmitted over said first bilateral optical transmission line are coupled so that said multiplexed signals of said wavelengths $\lambda_1$ to $\lambda_m$ are each transmitted over corresponding one of said plurality m of second bilateral optical transmission lines which corresponds thereto;

that there are provided for each of said wavelengths $\lambda_1$ to $\lambda_m$ at a first position means for generating an optical digital signal of a p-bit/sec transmission rate as a down-link optical signal of the wavelength concerned to said second position by a first optical transmitter having its wavelength stabilized by a wavelength stabilizer whose standard wavelength is variable, for making optical pulses of said optical digital signal "1s" at every n-th (n being an integer equal to or greater than 2) bits, for forming down-link information from said first to said second position by removing from said optical signal said "1" optical pulses at said every n bits, for coupling said optical digital signals of the respective wavelengths by a first optical coupler-splitter into a composite optical digital signal as said down-link information, and for forwarding said down-link information to said first bilateral optical transmission line as an optical digital signal of said p-bit/sec transmission rate;

that there are provided for each of said wavelengths $\lambda_1$ to $\lambda_m$ at said second position: means for splitting a part of said down-link optical signal transmitted to said second position, from a corresponding one of said second bilateral optical transmission lines; an optical receiver which receives said part split from said down-link optical signal, extracts a train of said optical pulses of said every n-th bits and takes out said p-bit/sec optical digital signal except said optical pulses of said every n-th bits as said down-link information after demodulating it; an optical gate circuit on which the remaining part of said down-link optical signal is incident; and means which turns ON and OFF said optical gate circuit in synchronization with said optical pulses of said every n-th bits in accordance with the presence or absence of pulses of up-link message data from said second to said first position to permit and inhibit the passage through said optical gate circuit of said optical pulses of said every n-th bits of said down-link optical signal incident on said optical gate circuit to form an up-link optical signal and forwards said up-link optical signal from said optical gate circuit to corresponding one of said second bilateral optical transmission lines; and that there are further provided for each of said wavelengths $\lambda_1$ to $\lambda_m$ at said first position: means for separating from said transmission line said up-link optical signal transmitted from said second position; and an optical receiver for receiving said separated up-link optical signal.

3. An optical access system according to claim 2, characterized in that said third optical coupler-splitter at said third position is a reflecting filter which is formed by a cascade connection of optical coupler-splitters for coupling and splitting optical signals of said m wavelengths $\lambda_1$ to $\lambda_m$ and has a peak value of its reflectivity at a wavelength $\lambda_0$ different from said m wavelengths $\lambda_1$ to $\lambda_m$.

4. An optical access system according to claim 2, characterized in:

that said first and second optical coupler-splitters at said first position are each an optical coupler-splitter which can be controlled to shift its wavelength characteristic and said third optical coupler-splitter at said third position is a reflecting filter which is formed by a cascade connection of optical coupler-splitters for coupling and splitting optical signals of said m wavelengths $\lambda_1$ to $\lambda_m$ and has a peak value of its reflectivity at a wavelength $\lambda_0$ different from said m wavelengths $\lambda_1$ to $\lambda_m$;

that a first "0" optical transmitter for said wavelength $\lambda_0$ is further provided at said first position, an optical signal from said first "0" optical transmitter is forwarded to said first bilateral optical transmission line, said optical signal of said wavelength $\lambda_0$ is reflected by said third optical-splitter at said third point back to said first position over said first bilateral optical transmission line, said reflected optical signal is separated from said first bilateral optical transmission line at said first position and is received by a first-zero optical receiver placed at said first position to detect said center wavelength $\lambda_0$ of said reflecting filter;

that a value proportional to a difference between said standard wavelength value from said wavelength stabilizer and N3 said wavelength $\lambda_0$ is fed back to said first and second optical coupler-splitters and an optical coupler-splitter in said wavelength stabilizer, so that said standard wavelength value of said wavelength stabilizer is corrected with said difference to reduce said difference; and that said output wavelengths $\lambda_1$ to $\lambda_m$ of said plurality m of first optical transmitters and the wavelength characteristics of said first and second optical coupler-splitters are controlled.

5. An optical access system according to claim 3, characterized in that said third optical coupler-splitter at said third position is further equipped with a function of distributing an optical signal of a wavelength $\mu$.

6. An optical access system according to claim 4, characterized in: that the output of an optical transmitter at said first position for generating a down-link optical signal of said wavelength m is coupled by said first optical coupler-splitter to the outputs from the other first optical transmitters; that said third optical coupler-splitter at said third position is a reflecting filter which is formed by a cascade connection of optical coupler-splitters for coupling and splitting optical signals of said m wavelengths $\lambda_1$ to $\lambda_m$; and has a peak value of its reflectivity at a wavelength $\lambda_0$ different from said m wavelengths $\lambda_1$ to $\lambda_m$ and that a plurality m of optical receivers are each provided at one of said plurality m of second positions for receiving said optical signal of said wavelength $\mu$.

7. An optical access system according to claim 1 or 2, characterized in that said optical gate circuit comprises a semiconductor laser amplifier.

\* \* \* \* \*